United States Patent [19]

Ellis

[11] Patent Number: 4,572,862
[45] Date of Patent: Feb. 25, 1986

[54] FIRE BARRIER COATING COMPOSITION CONTAINING MAGNESIUM OXYCHLORIDES AND HIGH ALUMINA CALCIUM ALUMINATE CEMENTS OR MAGNESIUM OXYSULPHATE

[75] Inventor: Harold Ellis, Miami, Fla.

[73] Assignee: Delphic Research Laboratories, Inc., Miami, Fla.

[21] Appl. No.: 603,799

[22] Filed: Apr. 25, 1984

[51] Int. Cl.$^4$ .......................... C04B 7/32; C04B 9/00
[52] U.S. Cl. .................................... 428/245; 106/104; 106/105; 106/106; 428/246; 428/248; 428/252; 428/703; 428/920; 428/921
[58] Field of Search ............... 428/245, 246, 248, 249, 428/252, 535, 703, 920, 921; 252/607, 608, 609, 610; 106/18.12, 18.26, 104, 105, 106

[56] References Cited

U.S. PATENT DOCUMENTS

| | | |
|---|---|---|
| 53,092 | 3/1866 | Sorel . |
| 504,211 | 8/1893 | Gallinowsky . |
| 882,774 | 3/1908 | Apfel et al. . |
| 1,107,856 | 8/1914 | Simmons . |
| 1,442,089 | 1/1923 | Costerhouse . |
| 1,574,862 | 3/1926 | Benson . |
| 1,916,971 | 7/1933 | Denning et al. . |
| 1,988,125 | 1/1935 | Kidwell . |
| 2,081,935 | 6/1937 | Jones et al. . |
| 2,511,904 | 6/1950 | Clasen et al. . |
| 3,020,077 | 2/1962 | Prior . |
| 3,464,543 | 9/1969 | Kwiatanowski et al. ............ 428/921 |
| 3,522,069 | 7/1970 | Checko et al. . |
| 3,719,512 | 3/1973 | Danielis . |
| 3,811,992 | 5/1974 | Handa et al. ........................ 428/921 |
| 3,857,727 | 12/1974 | Benisek ................................ 928/921 |
| 3,897,387 | 7/1975 | O'Shaughnessy ................ 106/18.12 |
| 3,956,538 | 5/1976 | Vartick ................................ 428/921 |
| 3,963,849 | 6/1976 | Thompson .......................... 428/921 |
| 3,973,978 | 8/1976 | Nakagawa et al. . |
| 3,996,142 | 12/1976 | White et al. ....................... 106/18.26 |
| 4,088,804 | 5/1978 | Cornwell et al. ................... 428/920 |
| 4,107,376 | 8/1978 | Ishikawa ............................. 428/921 |
| 4,111,711 | 9/1978 | Kiehl et al. . |
| 4,158,570 | 6/1979 | Irwin . |
| 4,159,302 | 6/1979 | Greve et al. ........................ 428/703 |
| 4,185,066 | 1/1980 | Temple . |
| 4,209,339 | 6/1980 | Smith-Johannsen . |
| 4,255,483 | 3/1981 | Byrd et al. ......................... 428/245 |
| 4,312,674 | 1/1982 | Stalego et al. . |
| 4,352,694 | 10/1982 | Smith-Johannsen . |
| 4,353,955 | 10/1982 | Cook ................................... 428/246 |
| 4,371,579 | 2/1983 | McCaskey et al. ................ 428/920 |
| 4,410,366 | 10/1983 | Birchall et al. . |
| 4,462,831 | 7/1984 | Raevsky et al. .................... 428/245 |

FOREIGN PATENT DOCUMENTS 957455  11/1974  Canada ............................ 106/18.26

*Primary Examiner*—George F. Lesmes
*Assistant Examiner*—William M. Atkinson
*Attorney, Agent, or Firm*—Beveridge, DeGrandi & Weilacher

[57] ABSTRACT

A novel, non-combustible thin coating, applied as an air-setting paint, is used to form a coherent fire-barrier on or between susceptible wood or plastic substrates, or other substances. Consisting of a paint-like slurry of three separate but compatible and mutually synergistic co-bonding systems, viz. magnesium "oxychloride" cement, plus high alumina mono-calcium aluminate cement, plus colloidal silica dispersed in dimethyl formamide (DMF), and utilizing an aqueous solution of magnesium chloride as the common hydrating fluid for the two cements, the coating retains its structural integrity through prolonged exposure to flame temperatures of 2000° F. The coating takes advantage of its brilliant whiteness to act as a thermal radiation reflector for the high radiation component of most flames. Used alone, or in combination with structural reinforcing geotextiles, such as non-woven spun-bonded polyester fabric, or woven and non-woven fiberglass or other natural or synthetic fabrics to form a laminate, the coating, while serving only transitorily as a heat barrier, effectively prevents the ignition of and flame spread of fire on the coated substrate. When placed between substrates at the partial sacrifice of the surface directly exposed to flame, it protects the back-substrate, and thus maintains structural integrity, as well as preventing the spread of flame to adjacent areas. The coating thus acts as a "fire-barrier" for which there are numerous applications.

18 Claims, No Drawings

FIRE BARRIER COATING COMPOSITION CONTAINING MAGNESIUM OXYCHLORIDES AND HIGH ALUMINA CALCIUM ALUMINATE CEMENTS OR MAGNESIUM OXYSULPHATE

BACKGROUND OF THE INVENTION

This invention relates to a fire barrier composition, a substrate coated with the composition, a laminate based on the coated substrate and a method of making the composition.

Numerous methods have been developed for controlling the ravages of fire. The rationale for each of these methods is found in the physics of combustion, the chemistry of flame, and the engineering of fire control systems. The disclosure herein presented treats with the use of coatings as a fire control method; a barrier system intended to prevent the ignition of and spread of flame along a combustible substrate.

The prior art discloses four major types of fire-protective coatings: (1) ablative; (2) intumescent; (3) sublimation and gas- or vapor-producing; (4) "ceramic" or inorganic. Ablative coatings are generally thick and heavy and costly, thus limiting their application to special uses. Intumescent coatings are generally soft and easily abraded, and have limited duration of protection—10 to 15 minutes when exposed to fire. Sublimative or gas-producing coatings have even shorter duration of protection—after their snuffing gases have been produced and wafted away from the surface, they are left without a protective mechanism. They have found their major use in the treatment of fibers and clothing. Ceramic coatings, as the name implies, require high-temperature curing in order to form the ceramic bond—,which many structural or building components cannot withstand. Inorganic coatings, such as Portland cement, gypsum, calcium aluminate cement, phosphate-bonded cement, metal-pigment loaded silicate coatings (sodium, potassium, ethyl, etc.), high-temperature silicone, and magnesium "oxychloride" and magnesium "oxysulphate" cements have all been proposed. This disclosure treats specifically with magnesium "oxychloride" in combination with calcium aluminate cements and other high-temperature resistant binders.

It is remarkable that in the long history of oxysalt cements, so few attempts have been made to convert these materials into a fire barrier in the form of thin paints. No doubt this is, in part, due to the prior major shortcomings of the products and the inability of the developers to overcome them. Amongst these shortcomings are: brittleness and rigidity, along with the proneness to spalling or decrepitating under heat. Unless mixed in stoichiometric ratios, the result is unsightly efflorescence ("white bloom") of the gauging salts (magnesium chloride, magnesium sulphate, magnesium carbonate) which continually condenses onto the surface of the coating. In other cases, especially in the oxysulphates, the excess liquids tend to synerese (squeeze out) and leave a greasy wet film at the surface. The coatings exhibit poor aging and weatherability characteristics, as well as solubility in water and rain, thereby making them unusable in outdoor situations. (The rain and high humidity leach the chloride and sulphate from the formulation, leaving void spaces as the result of the leaching process, which in turn leads to a disintegration of the coating.) They have a strong tendency to be hygroscopic, picking up moisture from the air, and thereby presenting a continuously wetted surface; they show poor resistance to common solvents; and there is a loss of tensile strength and cohesiveness after exposure to flame, causing cracking which exposes the substrate to ignition and subsequent combustion. In addition, some coatings are relatively soft and easily scratched and abraded, and unable to resist scrubbing (oxysulphate coatings are markedly softer than oxychloride coatings). Thin coatings, although they adhere well to substrates, frequently shrink in drying, and show "mud-cracking" (crazing), thus exposing the underlying substrate to direct flame impingement.

Thus, there exists a need in the art to develop a durable, quick-setting, non-combustible thin coating capable of protecting a variety of susceptible flammable substrates from ignition ("fire-barrier"), one which at the same time has all the attributes of a good paint and, additionally, aids in overcoming the above-listed shortcomings in the prior art. Another need is to develop a "fire-barrier" coating which does not spall or decrepitate or crack under the heat of flame and thus expose the underlying substrate. A further need is to develop an inexpensive Class "A" fire-retardant coating as defined by the requirements of the National Fire Protection Association (NFPA), utilizing inorganic non-toxic components, and based on magnesium oxide-magnesium chloride "oxysalt" chemistry. Other needs are to develop a coating which would bond to wood, plywood, and gypsum (plaster wallboard, to fiberglass board and batting, and to other substrates, imparting to them fire-barrier properties and increased flexural strength when incorporated as an element of the laminate structures. In addition, a barrier coating must possess a suite of other physical characteristics: hardness, compressive and tensile strengths, cohesiveness, adhesion, and a variety of other properties, including cosmetic attributes, which keeps the coating's integrity under the stresses of fire exposure, so that it does not crack, spall, flake off, or otherwise lose its ability to act as a fire barrier. The coating itself must be non-combustible, so that it does not contribute to the fuel, nor aid the progress of a flame front.

SUMMARY OF THE INVENTION

This invention aids in fulfilling these needs in the art. This disclosure crosses over and unites four major technologies: as a composition of material, it falls into the category of air-setting "hydraulic" binding cements, belonging to the group of caustic magnesia cements, generally called Sorel Cements, and more specifically as magnesium oxychloride cements; as a product it falls into the category of a coating or paint; as a use or application, it falls into the category of fire-control devices; and its associated characteristics permit it to be used for—and thus categorized as—a material of construction.

Specifically, presented herein is a description of a novel magnesium "oxychloride" cement coating, co-bonded with high alumina calcium aluminate cement and a colloidal silica, which overcomes the numerous deficiencies in the prior art coatings of this type, and the application of this coating, either alone, or in combination with a non-woven spunbond polyester fabric or a non-woven or woven glass fabric in the form of a thin laminate (composite coating") to fire-susceptible substrates to form a fire barrier capable of preventing ignition and flame spread of the structure. The coating is non-combustible in itself, and has adequate tensile and cohesive strength to maintain its integrity for the duration of the fire. It has excellent adhesion to a wide variety of substrates, and can be included as a structural component in the construction of gypsum wallboard, plywood, and other types of laminates.

Prior Art magnesia cement compositions consisted of: (a) The "binder ingredients; (b) The "activator" ingredients; (c) "fillers"; and (d) "adjuvants".

(a) The basic binding ingredient, a "cement", consists of a lightly calcined (heat-activated) magnesium oxide (MgO) which, when combined with the aqueous $MgCl_2$ or $MgSO_4$ salt solution, crystallizes into a network of interlocking crystals (and other ionic bonding systems) that gives strength to the system by bonding the fillers contained therein. In the present disclosure, high-alumina calcium aluminate cement and colloidal silica are added as compatible co-binders, imparting to the magnesium "oxychloride" cement important beneficial characteristics, as detailed below.

(b) An aqueous "activator" fluid (called a *gauging* liquid) which is a salt solution of magnesium chloride ($MgCl_2$) or magnesium sulphate ($MgSO_4$), or a combination thereof. Both salts are hydrated salts (6 $H_2O$ and 7 $H_2O$ respectively) easily soluble in water. Practice shows that to be effective in bringing about the setting of the MgO, the solutions must be concentrated (40% to 60%), generally expressed as a specific gravity, in either specific gravity or in degrees Baumé units (sp. gr. 1.22 to 1.26, or, 26° to 32° Baumé). These salts are best added in a stoichiometric ratio for the reaction, which does not leave an excess of salt that can effloresce to the surface or leach out in water or humid conditions; or react with the $CO_2$ in the air to form compounds which cause a disruption of the structure by occupying more space than originally occupied in the initial setting of the cement. In the present disclosure, the salt solutions are used as the common hydrating agent for both the MgO cement and the calcium aluminate cement. As demonstrated below, the use of this solution to hydrate the monocalcium aluminate obviates the necessity of maintaining an optional stoichiometric ratio of salt to MgO.

(c) Fillers—any of a wide variety of types of inert materials, such as sand, gravels, crushed rocks, silica flour, pumice, vermiculite, volcanic ash, perlite, wood shavings, sugarcane bagasse, asbestos, mineral fibers, etc. are added to impart special properties or lower the overall cost of the concrete.

(d) "Adjuvants"—a wide variety of accessory chemicals have been added to the slurry mix to bring about specific changes in the product, e.g. to make the concrete harder, to speed up the setting, to slow down the setting, to prevent the magnesium salt efflorescence, to waterproof the composition, to prevent shrinking (and hence shrinkage cracks), to prevent the absorption of atmospheric moisture, to decrease "harshness" in the mix and impart spreadability (smoothness), to decrease water or fluid demand, and etc.

As in most hydraulic aqueous cementitious systems, the binding ingredient or cement is intimately blended with the dry filler materials and any dry adjuvants and stored until needed. The dry ingredients are then mixed with the liquid ingredients, and the slurry poured or placed. The chemical reaction takes place, which "sets" the cement and forms the concrete. The mass, which is fluid at first, gradually thickens, becomes less "workable", forms a gel (initial set) which gradually and continuously becomes harder over a four-hour period. The hardening continues and strength increases for several days, so that by the third to fifth day maximum strength has been reached.

The coating, subject of this disclosure, consists of a two-part mixture: Part "A", the dry powdered binder and filler components; Part "B", the gauging or activator liquid components. The binder contains magnesium oxide, with specific characteristics, and high alumina calcium aluminate cement, along with fillers (silica flour, titanium dioxide, and, optionally, expanded vermiculite and alumina trihydrate). The liquid component consists of magnesium chloride solution of 1.26 specific gravity, colloidal silica dispersed in dimethyl formamide (DMF), and an anionic surfactant, sodium tetradecyl sulphate. As is common practice in the Art, part "A" is added to Part "B", with adequate mixing to form a slurry to the proper consistency for painting or coating, and the slurry permitted to set into a hard monolithic refractory layer. When used as a composite or laminated coating, either a non-woven spunbond polyester fabric, or a non-woven or woven fiberglass fabric is interposed between two thin layers of the coating. The coating or composite coating is applied to the desired substrate. When exposed to flames of up to 2000° F., the coatings retain their integrity and prevent the flame front from advancing. They themselves do not burn, and they prevent the direct ignition and flaming of the substrate for as long as 30 minutes—sufficient time, in most cases, for the original fire source to die out or bypass the protected area. Although they are efficient thermal insulators, as long as any water of hydration remains in the coating they are not designed to be long-term heat barriers, hence, after varying periods of time when wood substrate temperatures reach 700° to 800° F., wood substrates will char or carbonize, but do not ignite or burn. Similarly, plastic substrates, foam or sheet or block, depending on their particular time-temperature response, will char but not ignite, and thus do not contribute to the advancing flame front.

While the excellent high temperature and fire-resistive properties of coatings made from magnesium oxy-salts have long been recognized, relatively little advantage has been taken of these in attempting to adapt thin coatings to commercial use as fire retardants or fire barriers, due, in large measure, to major deficiencies in physical properties. There is widespread use of these materials in thick layers, ½" to 4" or even 6" in thickness, as insulative and fire-barrier mastics, grouts and cements. Although these thick insulations are frequently termed "coatings," this disclosure treats only with the use of magnesium "oxychloride" concrete as a thin paint or paint laminate.

DETAILED DESCRIPTION

The coatings and coating laminates described herein have the function of preventing the spread of fire by defensively protecting combustible substrates from igniting, preventing the flame from spreading and extending its area of destruction along the substrate, and thus prevent the accumulation of the combustible (and highly toxic) gasses in the structure. "Preventing" is an absolute term which would signify "fire-proofing". However, "fire-proof", "non-combustible" and even "fire-resistant" are all ambiguous terms unless qualified by a description of the fire conditions under a recognized test method. The American Society for Testing Materials (ASTM) does not recognize the term "fireproofing" since nothing, under the most severe conditions, cannot be fired. Commercially, the term is used to indicate the slowing down or delaying—and occasionally preventing—of the ignition and spread of flame of the substrate underlying the protective coating or cladding.

Currently available commercial "fire-retardant" coatings, such as intumescent-type fire-retardant paints which when exposed to high temperatures form an insulating blanket, are intended to function as their designation implies, to *delay* ignition for about 10 to 15 minutes, and reduce the surface burning rate of interior combustible finish materials. They do not render the underlying materials non-combustible, but serve only to retard ignition for a brief period of time. That delay furnishes an extra measure of escape time, affords time for implementation of other fire-fighting methods, and reduces structural damage. In contrast, the fire-barrier coatings, subject of this disclosure, are designed to *prevent* ignition and fire-spread of the underlying substrate by interposing an incombustible layer between the flame and the substrate. Fire-retardant coatings are rated as to "flame spread" when tested under standard widely accepted test conditions (e.g. ASTM E-84, Underwriters' Laboratories [UL] #723, National Fire Protection Association [NFPA] #25, or ASTM D-3806).

In development work, for comparative evaluation of candidate coating formulations and assessment of the numerous variables which enter into such formulations and compositions, ASTM Standard Test Method D-3806, "Small-Scale Evaluation of Fire Retardant Paints (2-foot Tunnel Method)" is preferred to the much more elaborate and time-consuming 8-foot tunnel test (ASTM E-286) and 25-foot tunnel test (ASTM E-84). D-3806 "determines the protection a coating affords its substrate and the comparative burning characteristics of coatings by evaluating the flame spread over the surface when ignited under controlled conditions in a small tunnel. This establishes a basis for comparing surface burning characteristics of different coatings without specific consideration of the end use parameters that might affect surface burning characteristics under actual fire conditions." In addition to the experimental flame spread rate, the test determines the weight of the panel consumed, fuel contributed to the fire, time of afterflaming, smoke emission and other characteristics. The Standard measures and describes the properties of the coatings in response to heat and flame under controlled laboratory conditions, but it warns that it should not be used to describe or appraise the fire hazard of assemblies under actual fire conditions. However, the test may be used as an element in fire risk assessment.

The test consists of impinging directly onto the surface coating a 2000° F. gas flame supplying heat at 5085 BTU's per hour for 4 minutes, while the 2-foot long by 4-inch wide test panel is suspended above the burner, coated surface facing downward, at an upward angle in a chamber. The angle of the test panel and the draft of the chamber encourages any flame in the coating and substrate initiated from the burner to proceed upward along the substrate. The extent of this flame front is measured and compared with the known substrate standards (0 and 100).

"Flame spread" is the ratio of the measured extent of the burning of the substrate protected by the candidate paint, contrasted with a known incombustible rated standard substrate (cement-asbestos board) as 0 and an unprotected highly combustible wood substrate, such as Red Oak, with a rating of 100.

More specifically, "*Flame Spread*" is a Ratio, not inches. The maximum extension of the flame on the sample is measured. The maximum extent of the flame (Flame Spread) of the asbestos board is considered as 6.5", with an adjustment *Factor* of 4.45. The length of the asbestos board flame is subtracted from the flame length of the test specimen, and the difference is multiplied by the adjustment factor to yield the flame spread of the test sample. For example, in Table II, Test j.2 of the Type II coating alone on isocyanurate foam board, the flame spread on the specimen was 7" long, minus 6.5" length for asbestos board, which yields an 0.5" difference, and when multiplied by the 4.45 *Factor*, equals the reported Flame Spread of 2.2.

"Percent Loss" is the total weight of the specimen prior to the test minus the total weight of the specimen after the test, ×100. This includes loss of moisture due to steam vaporization, as well as losses due to combustion. In the case of the coatings, subject of this disclosure, most of the loss in weight when applied to susceptible substrates is due to this water-of-hydration loss from the coating under the area of flame impingement, without significant deleterious effects on the coating.

Twenty readings are taken in determining "Smoke Density", and summed. This is divided by 2,000. The value of Red Oak, considered a standard with a value of 1924, is subtracted, and the resultant is multiplied by 100 to convert the specimen's value into a percentage which relates to the value of the Red Oak as 100% and asbestos board as 0%.

Flame spread is considered the main factor associated with testing fire retardant coatings. The "fire-retardant" coatings currently available are rated as low as 10, or as high as 60 to 70. The lower the rating, the longer the coating will retard flames. In the higher ranges, e.g., 60 to 70, the coating affords little or no fire protection.

The coatings and laminates described herein, which are rated O flame spread (as well as O fuel contributed to the fire and O smoke developed) are a significant advance in the art of protective coatings in that they are "fire barriers", not merely "fire-retardants". They are designed to interpose a non-combustible, coherent, durable layer between a flame and a combustible substrate, and thus prevent the ignition of the substrate and the subsequent flame spread along the substrate. Under operational fire conditions, following a period of time, the initial fire source will have exhausted its local fuel supply and burned itself out.

1. Formulations

TABLE I lists the several formulas for the Fire Barrier Coatings Developed in this disclosure. The numbers in parentheses listed below correspond to the numbers in the "Materials" column of TABLE I.:

The first five items of Part "A" are all finely comminuted solid powders, while the sixth is a granulated solid of −16 mesh. Each material is first dried in a hot air oven at 200° F., mixed together, and, except for item (6), intimately blended by mulling. The surfactant (9) is added drop-by-drop to the $MgCl_2$ solution (7) and the colloidal silica (10) is added slowly to (7)+(9). This causes an opalescence in the clear solution, but no precipitate. The reaction is highly exothermic. There is a marked increase in the viscosity of the solution, which decreases again upon standing. The mixed powders, (1)+(2)+(3)+(4)+(5)+(6), are then added to the liquid phase (Part "B")−(7) or (8)+(9)+(10), slowly, with constant mechanical stirring, so that each particle is completely wetted out by the liquid. A smooth suspension of paint-like consistency results. This is applied, while still fluid, by any common method of coating application (brushing, rolling, spraying, etc.). Pot life is short—20 to 30 minutes, with the paint gradually thickening until it becomes a soft gel. The gel gradually hardens with initial set at 1 to 1½ hours, and final set in 2 to 4 hours. Pot life and set time can be controlled by varying the solids to liquid ratio—most easily be increasing (or decreasing) the amount of the fluid phase. Final set time of the coating is significantly decreased by elevating the cure temperature to 100°-120° F. In these formulations, the final set of the coating, that is, the hardness and other surface characteristics, is relatively insensitive to the solids:liquid ratio. Upon drying, the coating is a brilliant white; porcelain-like; refractory hard (Mohs 5.5–6.0). and crack-free, with essentially zero shrinkage. After 48 to 72 hours a cure time, the coating is highly resistant to direct flame impingement, and withstands 1900° to 2000° F. without cracking for 30 to 45 minutes and longer, when suitably supported on a fibrous matrix (non-woven spunbond polyester, woven or non-woven fiberglass fabric, fiberglass fibers, etc.) which absorbs the thermal stresses of differential expansion and crystallographic alterations accompanying the firing.

HR grade is 68 $M^2$/gm. while the LR grade shows 36 $M^2$/gm. Both have a median particle size of less than 2 microns. Both have been used successfully—the only modification required is the quantity of $MgCl_2$ solution necessary to make a paint of the required consistency. Since their densities are lower than the "OXYMAG", they bulk more (30 lbs./ft.$^3$ vs. 48 lbs./ft.$^3$) and a greater volume of material, with a larger surface area, is required to yield the weights shown in the type formulation. This requires approximately 20% to 25% greater fluid volume to wet out and produce a fluid paint. Where open pot time is more important than rapid initial set, the LR grade can be used. On a volume-of-paint basis, the MAGOX grades are less expensive than the OXYMAG grade. Other producers, such as MARTIN-MARIETTA CORPORATION, produce a variety of *sea water* (brine) magnesia grades, (which correspond to the HR grades of BASIC) "MAG-CHEM 40", a very high reactive grade; "MAG-CHEM 30", a high reactive grade; and "MAG-CHEM 10", a low reactive grade.

The order of blending and mixing is of some importance. The solids are added to the fluid mixture with constant stirring, so that each powder particle is wetted out and no lumps remain. After mixing is complete, the

TABLE I

TYPE FORMULAS - FIRE BARRIER COATINGS

| Materials | I | II | III | IV | V | VI | VII |
|---|---|---|---|---|---|---|---|
| Part "A" (Binder Components - Powders) | | | | | | | |
| (1) Magnesium Oxide (MgO) | 400 gms. | 400 gms. | 400 gms. | 400 gms. | 400 gms. | 400 gms. | 400 gms. |
| (2) High Alumina Calcium Aluminate Cement | 100 gms | 100 gms. | 100 gms. | 100 gms. | — | — | 150 gms. |
| (3) Silica flour | 100 gms. | 100 gms. | 100 gms. | 50 gms. | — | 200 gms. | — |
| (4) Titanium Dioxide ($TiO_2$) | 15 gms. | 15 gms. | 15 gms. | 15 gms. | 15 gms. | 15 gms. | 15 gms. |
| (5) Alumina Trihydrate | — | — | — | — | 100 gms. | — | 50 gms. |
| (6) Expanded Vermiculite (−16 mesh) | — | — | — | 70 gms. | 50 gms. | — | 70 gms. |
| Part "B" (Gauging or Activator Components - Liquids) | | | | | | | |
| (7) Magnesium Chloride ($MgCl_2$) (1.26 sp. gr.) | 380 cc. | 440 cc. | 380 cc. | 490 cc. | 400 cc. | — | — |
| (8) Magnesium Sulphate ($MgSO_4$) (1.25 sp. gr.) | — | — | — | — | — | 400 cc. | 560 cc. |
| (9) Niaproof 4 Surfactant | 4.0 cc. | — | 4.0 cc. | 4.0 cc. | 4.0 cc. | 4.0 cc. | — |
| (10) Colloidal Silica (35% in DMF) | 80 cc. | — | — | — | — | 80 cc. | — |

2. Materials Identification (1) Three types of MgO (magnesia) have been used in the principal binding system which differ in reactivity as a result of originating from different sources and receiving differing heat treatments. In the formulations listed in Table I, "OXYMAG" grade from Basic Chemicals, Inc. was used—a calcined magnesia *ore* from Nevada, with 1.5% lime (CaO), 95% MgO, 3% loss on ignition, and with 99.6% passing 200 mesh. It is treated to eliminate any tendency to expand due to the free lime. Its bulk density is twice that of sea-water-derived magnesias, but has great binding power for fillers and high reactivity with $MgCl_2$ and $MgSO_4$. Alternatively, both "MAGOX" 98 HR and "MAGOX" 98 LR magnesias (also from Basic Chemicals, Inc.) have been used with equal success in the fire barrier coating, but for different applications. These "MAGOX" materials are calcined magnesia from *sea water* (brine) sources. HR refers to high reactivity; LR refers to low reactivity. Both contain 97% to 98% MgO, 1% lime (CaO) and only 0.15% $Fe_2O_3$, so that they are white. Due to the method of calcination, the specific surface area of the paint, using the HR grade of MgO, has a pot life of 15 minutes before thickening to a point which makes brushing or rolling difficult. Using the LR grade, the pot life is extended to 20 to 25 minutes, with the final setting extended to 3 to 4 hours.

(2) High Alumina Calcium Aluminate Cement: Both ALCOA (Aluminum Company of America) CA-25 (High Alumina Refractory Cement) and LONE STAR LaFARGE, INC.SECAR 71 or 80 have been used as a co-binding system with the magnesium "oxy" cements, with equal success. The materials are equivalent. The principal constituent of these HAC (high alumina cements) is mono-calcium aluminate, ($CaO.2.5\ Al_2O_3$). They are hydraulic cements containing a high percentage of alumina ($Al_2O_3$), approximately 80%, and calcium oxide (CaO), approximately 17%–18%. (In contrast, Portland cements are calcium silicates; Plaster-of-Paris cements are calcium sulphates.) Water is the generally-accepted "activating" agent, which causes the essentially anhydrous mixture (only 1.8% loss on ignition) to form a strong interlocking crystalline bond in setting. Setting is rapid, initial set taking place in ½ to 1 hour, and final set in 4 to 5 hours, and maximum strengths are achieved in one day. Useful service temperature of the set concrete is 3200° F. It is widely used in castable refractories. The HAC lose strength at intermediate temperature ranges of 900°-1200° F., but achieve much higher strengths through ceramitization at the 1500° F. and higher temperature ranges. They resist the corrosive action of calcium and magnesium sulphates and chlorides. The cements are white; they are finely ground, with a specific surface of about 10,000 cm$^2$/gm. (Blaine). Compressive strength of a 1:3 mortar at 7 days is about 9400 psi, while "neat" cements, depending on the cement:water ratio, can achieve 8,000 to 18,000 psi.

The strengths developed with these high alumina cements are significantly greater than when lower grade calcium aluminate cements are used, e.g. U.S. STEEL CORP., Atlas Cement Division's "LUMNITE" cement, with 47.0% $Al_2O_3$, 34.3% CaO and 7.4% $Fe_2O_3$, or "REFCON" Cement, with 58.5% $Al_2O_3$, 33.5% CaO and 7.4% $Fe_2O_3$, both of which are brown in color; or LONE STAR LaFARGE "FONDU" cement, with 38% −40% $Al_2O_3$, 39% CaO and 15% $Fe_2O_3$.

The calcium aluminate cement is *not* to be confused with alumina ($Al_2O_3$), frequently called out as either a high strength "filler" in cemented products, or as a "binder" in refractories and ceramics. In the latter case, it functions as a high-strength and high-temperature binder only after high-temperature fusion in a furnace.

In the listed formulations the "water" of hydration for the mono calcium aluminate is supplied by the magnesium chloride (or magnesium sulphate) solution. Magnesium hydroxide, the principal ingredient of the "mag-oxy" cements, according to one current theory, retards the setting of the alumina cement; but the magnesium sulphate high concentration accelerates the set. Similarly, magnesium chloride in low concentration retards the set, but in high concentration accelerates the set. In the formulations, listed in Table I, the entire body of cementitious materials develop an initial set in 1½ to 2 hours, and a final set in 3 to 4 hours.

The set cement is highly resistive to the leaching action of water, and is impervious to the corrosive action of sulphates and chlorides (both of which have severe effects on Portland Cement Concrete).

The addition of the high alumina calcium aluminate cement as a co-binder is completely compatible with the MgO binder system, and adds considerably to the hardness and abrasion resistance of the coatings, as well as improving resistance to leaching of the magnesium salts in the set cement by rain, thus improving the waterproofness of the product. In addition, it effectively prevents the efflorescence of the dried magnesium salts and the syneresis of the soluble salts.

(3) Silica Flour. A standard commercial commodity available from many producers, consists of finely ground (smaller than 200 mesh) silica sand (silicon dioxide, $SiO_2$) low in iron, glistening white. It is used as an incombustible low-cost filler. It affords rheological (flow) control to the fluid paint, while supplying hardness and abrasion resistance and innumerable sites for crystal stess relaxation in the cured films, especially at elevated temperatures when the silica goes through its own phase changes.

(4) Titanium Dioxide, ($TiO_2$). A standard commercial commodity available from many producers. This ingredient, used at a relatively low concentration, functions as a whitening agent—not only decoratively, but more importantly as an infrared radiant heat reflector. $TiO_2$ has great "hiding power", and imparts a brilliant white to the product, obviously of very low emissivity ($\epsilon$), and high spectral reflectance ($\alpha$) in visible light, but also at infrared wavelengths. Since burning gasses and flames emit a high percentage of their heat as radiant heat, the low emissivity and high reflectance of these coatings contribute to lowering the surface temperature on the coating and its underlying substrate.

(5) Alumina Trihydrate($Al_2O_3.3H_2O$) with approximately 35% bound water, is widely used as a fire retardant filler for plastics. Its mode of action is similar to that of the hydrated "mag-oxy" cements. The hydrate retards flame by serving as a "heat-sink", absorbing heat in the process of decomposition, and liberating water vapor (steam) which serves as a gaseous blanket protecting the substrate. The grade used in the type formulas was SB 331 from SOLEM INDUSTRIES, INC., Norcross, Ga., with a mean particle size of 10 microns, and TECHFILL A-112, with a mean particle size of 12 microns, produced by GREAT LAKES MINERAL CO., of Troy, Mich. Both products are brilliant white with high specular reflectivity. The alumina trihydrate is used to substitute for the silica flour as a filler. While the coatings it produces are not as hard as the silica flour coatings, this decrease is not significant, and is compensated for by the additional water of hydration it adds.

(6) Expanded Vermiculite. Because of its low "K" factor and non-combustibility, expanded vermiculite has long been used for pour-in insulation, insulating concrete, and a wide variety of high-temperature insulations. Its fusion point is rated at 2200° to 2400° F., and it has a specific heat of 0.20. When added as a filler to the Part "A" binder components, while its contribution to the heat-barrier properties of the coating is not insignificant (since it occupies, by volume, almost 20% of the fluid paint, and 25% of the dry paint) its main function is to serve as a stress absorber. The grade of expanded vermiculite used in Type Coating IV is size No. 3, with a density of 5 to 6 pounds per cubic foot. This commercial grade is screened through a −16 mesh sieve, and only the material passing through the mesh is used. Domestic U.S.A. vermiculite tends to be dark brown in color, while South African grades tend to be a light cream color and require lesser $TiO_2$ to hide the off-color it imparts to the coating. In plant manufacturing, the particles should be slightly wetted with the $MgCl_2$ (or $MgSO_4$) solution prior to adding to the total mix, but for field application, it is added as a dry ingredient to the rest of the powders in Part "A", and enobled by these powders in the mixing. The particles disperse quite readily in the mix, and there is little tendency to segregate. In the dry paint, they impart to the coating a "pebbly" surface, which contributes to the reflectivity of the coating. Thus, in painting the particles are evenly dispersed. During exposure to flame at 1800° to 1950° F., the crystallite components of the "oxychloride" cement undergo phase changes which result in compression stresses on the integrity of the film. The vermiculite particles are not subject to these phase changes at those temperatures, and retain their integrity. They are thus capable of serving as stress-relaxation points. Due to their lamellar structure with air voids between the layers, the particles are compressible, and thus take up the stresses of the thermal expansion which accompanies the phase changes of the cement components. This prevents the "popping" (spalling or decrepitating) and subsequent cracking of the coatings common to many rigid and brittle "ceramic" films. As noted in the examples presented below, not all formulations require the inclusion of vermiculite particles, and they are not normally added to those coatings included in the laminates made with fabric interlays, which take up the stress points in a similar manner.

(7) $MgCl_2$ Solution in water—1.26 sp. gr. (30° Baumé). DOW CHEMICAL CO., Tech. Flake Grade, supplied in a dry form as 99.0% $MgCl_2.6H_2O$. The material is a thin white opaque flake, easily soluble in water, but high deliquescent. The hexahydrate material contains 46% to 52% $MgCl_2$. The hexahydrate is a commodity article of commerce supplied by many chemical manufacturers. Because of the hygroscopicity of the hexahydrate, it cannot be packed dry with the MgO and other solid materials into a one-package magnesium oxychloride cement product. Formerly covered by ASTM Specification #C 276 (now discontinued), the DOW CHEMICAL CO. Product Data and Sales Specification is generally accepted as the standard. The $MgCl_2.6H_2O$ is soluble to the extent of 155 gm./100 cc. distilled water at 20° C. A 28% solution based on $MgCl_2$ yields 30° Baumé at 60° F. In practice, 1500 gms. of the hexahydrate salt dissolved in 1000 cc. of city tap water yields 1800 cc. of a 1.26 sp.gr. (30° Baumé) solution, with a pH of 6.0. It is recommended that the solution be allowed to "mature" for 24 hours prior to use; and it is stable indefinitely, after preparation, in closed containers. Practice shows that a minimum concentration of a sp. gr. of 1.18–1.20 is required to successfully bring about the SOREL cementitious reaction. The more concentrated the solution, the harder the final product. Too great a quantity of $MgCl_2$ leads to efflorescence under humid conditions. Both the salt and solution are corrosive to ferrous metals, so precautions must be taken in the preparation of the salt solution. Also, because of the hygroscopicity, the flake salt must be kept from exposure to the air.

This solution, in the proportion disclosed in the formulas listed in Table I, is the "activator" or gauging solution, used to wet out and hydrate the MgO and the calcium aluminate cement, and is the principal liquid vehicle for the aqueous-based fire-barrier paint.

(8) Alternatively, the gauging solution may be $MgSO_4$ at a specific gravity of 1.25, or 29° Baumé. This is the common Epsom Salts, ($MgSO_4.7H_2O$, a flaked, colorless crystalline material), a commodity product, produced by many chemical manufacturers. Formerly covered by ASTM Specification #C-277, this specification is now discontinued. The hydrated salt is readily soluble in water and highly endothermic—chilling the water in the process of dissolving. 500 gms. of the salt, dissolved in 1 liter (or 4.169 lbs. in 1 U.S. gallon) of water yields a sp. gr. of 1.25 or 26° Baumé. This makes a net 41% solution. In tap water, the resulting pH is 5.3. The reaction between the MgO and $MgSO_4$ is well known in the Art of making fire-resistive mastics (and stucco), but the resulting "concrete" is noticeably softer than when made with $MgCl_2$. Also, the product shrinks considerably more, forming surface and deep cracks. This tendency to shink is counteracted by the calcium aluminate cement and/or by the addition to the sulphate solution of phosphate salts or $MgCl_2$ salts.

Because of the lower hygroscopicity of the $MgSO_4.7H_2O$, it is frequently packaged with the MgO into a one-component oxysulphate cement base requiring only the addition of water. However, because the preferred formulas listed in Table I contain other fluid ingredients besides the salt solution, they require a 2-component packaging system.

A third alternative formulation calls for the mixing of the above-formulated magnesium chloride solution with the magnesium sulphate solution in proportions of 1:1, 2:1, or 3:1. This formulation hardens the product, and reduces the tendency to shrink and crack.

(9) Niaproof Anionic Surfactant 4, supplied by NIACET CORP., Niagara Falls, N.Y. 14302, is a 27% aqueous solution of sodium tetradecyl sulphate, $[C_4H_9CH(C_2H_5)C_2H_4CH(SO_4Na)CH_2CH(CH_3)_2]$.

Whereas many surfactants (dispersants) were precipitated by the high magnesium salt solutions, or cause a coagulation or gelling of the colloidal silica, or cause objectionable foaming during the mixing of the paint, NAS 4 met all compatibility requirements. Its function is to reduce the surface tension of the liquid phase ("B") of the formulation, and thus enable it to wet out the solid particles more efficiently. It acts as a dispersant for the powders in the formula. As such, it reduces the quantity of fluid required to make a satisfactory paint viscosity (the "water of convenience"), and thus yields a stronger paint film, with less tendency to shrink-crack (craze) while excess fluid evaporates.

(10) Colloidal Silica, or silica sols. NALCOAG 2325, a 35% colloidal dispersion of silica in the non-aqueous polar solvent dimethyl formamide (DMF), from NALCO CHEMICAL CO., Chicago, Ill.

The particles of silica are discrete, non-crystalline, spherical, submicron (average particle diameter of 20 millimicrons; average surface area 150 $M^2$/gms). The dispersion contains 35% silica as $SiO_2$. When diluted with water, the DMF dispersion yields a pH of 5.

The dried particles of the silica develop strong adhesive and cohesive bonds. Under high temperatures of up to 2000° F., they show little crystallographic transformation. In the Type I and Type VI formulas in which used, the colloidal silica performs the function of a densifying agent; a waterproofing agent; a hardening agent; a surface gloss-producing agent ("porcelainizing"); a co-bonding agent along with the "magoxy" and calcium aluminate cements; and an adhesive aiding bonding of the coating to non-porous substrates. Colloidal silicas have been widely used as binders for fillers in the production of high-temperature mineral and inorganic fiber shapes (principally thermal insulation, e.g. APOLLO spacecraft heat shields); as frictionizing (anti-skid) agents in coatings; as catalysts; as anti-tacking agents in polyolefinic films; in protective coatings to increase abrasion resistance of decorative laminates; as polishing agents (e.g. silicon wafers); etc.

By far the most commonly used type of dispersion is the aqueous, negatively charged sodium ion-stabilized form, usually supplied as 15%, 30%, 40% or 50% $SiO_2$ concentration, depending on the particle size of the silica. All are highly alkaline. Other types are stabilized with ammonium ion or chloride ion (positive particle charges); and instead of a suspensoid in water, are dispersed in acidic solutions or oils, or coated with aluminum acetate, etc. Colloidal silicas are produced by DuPONT INDUSTRIAL CHEMICALS Division of E. I. DuPONT DeNEMOURS; by the PQ CORP. (formerly Philadelphia Quartz Co.); by NALCO CHEMICAL CO., and by several others in the United States, as well as in Japan, Germany, England, etc.

While all types of colloidal silicas were not tested in the development of the listed formulations, five types were tested, with sufficiently differing results (mainly, compatabilities amongst the various other fluid and powder ingredients) to lead to the selection of the DMF as the preferred type of dispersion. When 30% and 40% alkaline aqueous dispersions of the commonly used sodium ion stabilized form are added to the high salt content $MgCl_2$ or $MgSO_4$ solutions, the silica precipitates out and leaves a soft semi-solid gel, containing numerous silica clumps.

Aluminum acetate coated silica sol (NALCOAG ISJ-613) is aqueous based and completely miscible with the liquid phase of the listed formulations. Containing 3% colloidal alumina, plus 19% colloidal silica, ISJ-613 is acidic, and has a pH of 4. The $Al_2O_3$ and $SiO_2$ particles are positively charged. The ISJ-613 yielded excellent porcelain-like hard waterproof coatings, but the paint is "harsh", i.e., while the fluid paint is smooth, it shows poor flow and brush-mark fill in. It also reduces the pot life of the paint. However, it markedly accelerates the initial and final setting of the coating to as low as 1 to 1½ hours.

In the Type formulation I, calling for the use of the DMF dispersed colloidal silica, it may be noted that the addition of the NALCOAG 2325 to the magnesium chloride solution generates considerable heat, —a highly exothermic reaction—but while it causes an opalescence in the salt solution, there is no precipitation. There is an increase in solution viscosity, which is compensated for by the addition of a surfactant, NAS 4.

Colloidal silicas should not be confused with other types of silicas or silicates. They are significantly different from soluble silicates (e.g., sodium, potassium, lithium or other alkali metal silicates); organic silicates (e.g. ethyl silicate); fumed silica ("Cab-o-Sil", "Aerosil"); microfine silicas; amorphous silicas; silica gels; silica flour or silica powder.

3. Novel Properties of the Formulation

To accomplish the objectives listed above, the basic SOREL cement reaction was modified at several critical points. In order to increase the fluidity of the paint so that it could be brushed, sprayed, or rolled onto the substrate, with good flow and "fill-in" to eliminate streaks, the ratio of activator or gauging fluid was increased beyond that customary in the Art. At such ratios of fluid MgO to solids (approximately 1 cc. of a 1.26 sp. gr. $MgCl_2$ solution fluid per gram of MgO), the customary result would be excessive syneresis of the gauging fluid resulting in an "oily" surface, followed by crystallization of the salt, depositing a heavy efflorescence of white powder, followed in turn by hygroscopic adsorption of atmospheric moisture, leaving a continuously wet surface. The novel formulation removes the criticality of maintaining the correct stoichiometric balance between the magnesium salts and the magnesium oxide in order to prevent the efflorescence and syneresis, since the high alumina calcium aluminate cement, utilized as a co-binder, in its own hydration/crystallization reaction binds all the excess salt solution. The formulation facilitates the adding of sufficient fluid to permit ease of working, and smooth coating flow without the deleterious effects of excess activator solution. Excess fluid normally results in high film shrinkage and unacceptable crazing of the coating. The formulations herein presented, by utilizing the salt solutions as the "water of hydration" for the calcium aluminate cement have completely obviated this problem, and the coatings are crack-free. They have remained crack-free during almost two years of ageing under exposure to the fumes and fluorescent lighting of an industrial chemical laboratory.

The surfactant (9), Niaproof 4, by "wetting out" the powdered binders and fillers, and performing this function in the high salt content milieu, decreases the fluid requirements for a workable formulation, thus contributing to the strengthening of the coating.

In the setting process, the coatings show essentially zero shrinkage, and in addition to the absence of shrinkage cracking, they do not lift off from the substrate. They exhibit excellent adhesion to metal, wood, fiberboard, concrete, wall paper, fiberglass fabric and board, clay and ceramic tiles, asbestos cement, and many plastics—including plastic foams. The coatings do not adhere to fluoroplastics nor to polyester film (however, they adhere tenaciously to polyester fabrics). The separation from polyester film is complete, imparting a smooth, glossy surface to the coating. This "release paper" characteristic is made use of in lining the surfaces of molds into which the formulations are cast; or by covering the coatings with the polyester film so that when the film is stripped off, it leaves a smooth glossy surface. They can be made to bond to the films by using an intermediary tack coat of an acrylic latex or other adhesive.

The coatings set equally well whether covered by the polyester film or exposed to air.

The addition of the calcium aluminate cement and/or colloidal silica, both acting as co-binders, imparts a surface hardness (Mohs 5.5–6.0) and abrasion resistance exceeding that of Prior Art "oxychloride" coatings, and brings to the normally much softer "oxysulphate" coatings a hardness (Mohs 4.0–5.0) almost equal to that of the "oxychloride" coatings. (It should be noted that one of the major drawbacks to the use of "oxysulphate" floors and walls, stucco, fireproof mastic coatings, despite the many advantages of this material, resides in its "softness". The use of calcium aluminate cement overcomes this failing.)

A high alumina calcium aluminate cement (70% to 80% $Al_2O_3$) is preferred to the cements which contain lower concentrations of alumina (47% to 58%). These latter are brown in color and detract from the high-reflectivity white which is desired in the product, but, more importantly, contain much higher concentrations of calcium oxide (CaO), 34% to 39%, versus 17%, which has a disruptive effect on the crystallites of the cement at high temperatures, and leads to catastrophic cracking of the coating when exposed to flame.

Novelty also rests in the use of colloidal silica, dispersed in dimethyl formamide (10) as a compatible co-bonding system with the other two co-bonding systems (1+7) and (2+7). Thus the system contains three bonding systems, all of which have differing characteristics, and retain their cohesiveness at different temperatures. The "magoxychloride" loses its water of hydration at 570° F., and starts to calcine at 1000° F. The colloidal silica is stable to 2000° F., and the calcium aluminate cement to 3200° F., with transitory weakness at 800° to 1200° F. while it undergoes phase transformation.

Coatings I–V are self-levelling and with final set, usually in 2 to 2½ hours, they are brilliant white, smooth, hard (Mohs 5.5–6.0), dense, difficult to scratch except with pointed steel objects, and capable of faithfully reproducing the finest detail of a mold. They develop a high gloss if cast against a smooth plastic film (e.g., polyester or polypropylene) or a plastic mold without the need of a release agent. If cured with the surface exposed, Type I's surface stays glabrous (shiny), but the others develop a matte finish. The coatings may be tinted or colored by the addition of water- or oil-based mineral pigments, such as the HOECHST CORP. "Colanyl" pastes (yellow, brown, green, etc.); and the coatings may be overprinted by silk-screening or other printing methods to give a decorative pattern. They may be covered with wallpaper, with the coating serving as a high temperature resistant adhesive, if the paper is applied while the paint is still in the gel stage.

The coatings are resistant to water leaching and to the action of many polar and non-polar and aromatic solvents. They are abrasion resistant. They are crack-free, age without noticeable changes, and exhibit little shrinkage in curing.

As discussed above, the $TiO_2$ imparts a brilliant whiteness to the coatings, which reflects much of the incident infrared radiation of a flame, and thus contributes to the lowering of the surface temperature of the substrate. Most of the heat transferred by a flame is radiative (radiation). While flat black paint will absorb 92-98% of this incident radiation, a white glossy paint will absorb only 21% and *reflect* the other 79%. This difference between a white reflective surface and a dull absorptive surface can mean a lowering of several hundred degrees surface temperature in the former. NASA has determined that increasing the reflection of radiant heat from 30% to 80%F resulted in a decrease of surface temperature from 2300° F. down to 1900° F. Thus, the high radiation reflective surface imparted by the glossy white coatings described in this disclosure should operate at considerably cooler temperatures and require a longer period of time before their protected surfaces reach ignition temperature.

Another novel feature of these types of formulations, compared to the Prior Art, is the use of colloidal silica dispersion in DMF (10), which further increases the hardness, density, abrasion resistance, and hydrophobicity, and waterproofs the coating, further decreasing any tendency for rain to leach the magnesium salts. It also prevents the coating from picking up moisture from the air. The colloidal silica imparts a high sheen and porcelain-like surface to the coating.

The coatings can be applied by brushing, spraying, dipping, roller coating, silk-screening, or by any other convenient method. Several layers of coating can be applied, on top of one another. The freshly-applied layers show excellent bonding to the older base layer.

The coatings can be texturized by adding sand, gravels, vermiculite, expanded perlite, etc.

The formulations, currently, because of the short shelf life after mixing, must be packaged as a ready-to-use two-component system: Part "A", the blended powdered solids; and Part "B", the liquid components, to be mixed at volumetric ratios which correspond to the metric weights shown in Table I.

When coated onto both surfaces of a free-standing woven or non-woven natural fiber or synthetic resin fabric or fiberglass fabric, the cured coatings impart complete fire-retardancy to the fabric. Under the 1950° F. temperature and high velocity of a propane torch for 30 to 60 minutes, the fabric does not combust, and there is zero flame-spread from the area of the cone of impingement of the flame. The organic fabric pyrolyzes into a carbonized skeleton within the ennobling coating, and the fiberglass melts, but the structural strength of the coating holds the fabric together; nor does the flame penetrate to the opposite side of the barrier. The fabric serves both as a stroma or supporting framework, and as a network of stress-relief foci. The numerous minute fibrils interlock with the crystallites as they form, leaving compressible points at which the volumetric changes associated with the heat-engendered phase changes in the cements have an opportunity to release their thermodynamic energies. They also serve to increase the tensile strength of the coatings.

The thermal dissipation of polyester or ground fabric is not as high as a metallic screen would be, it is better than that of the magnesium "oxychloride" cement itself, and thus reduces localized temperature buildup. No optimum or preferred fabric porosity has been established, but should be in the range of 50% to 95%. The HOESCH Trevira spunbond grade 1110 polyester fabric used in the examples given below weighs 3.3 oz. per square yard, has a porosity of 85%, and has a melting point of 485° to 540° F.

A variety of laminating fabrics has been used; non-woven spunbond polyester (geotextile); woven polyester; nylon; jute (burlap); cotton, wool; steel wool; aluminum and carbon steel, −16 mesh window screening, woven cloth (graphite), cloth's woven aramid ("Kevlar") fabric; etc. Materials of choice are the woven fiberglass, where it is desired to keep to a minimum smoke and gasses generated by the pyrolysis of organic materials, and the spunbond polyester, which imparts desired physical properties (high tensile strengths) until called upon to serve as a barrier in an actual fire.

This laminate system of a coating on both surfaces of a fabric can be laid on a susceptible substrate (wood, fiberboard, composition board, plastic laminates, foamed plastics, etc.) with similar results. The coating on the undersurface acts as a high-temperature bonding adhesive for the fabric-to-substrate interface. The paint layer on the top surface forms the refractory-hard coating. If the coating laminate is laid between two mating substrates, the top layer also acts as another high-temperature bonding adhesive. Whether on the surface of one fire-susceptible substrate, or bonded between two substrates, the coating laminate serves as a fire barrier. The coating laminate adds considerable tensile strength to the structure. Since the coating material fills the voids and spaces within and between the fibers of the mesh of the fabric, the laminate carries more weight.

The effiency of the supporting "textile" in the laminate is due to a combination of: (1) fabric porosity (i.e., the volume of voids divided by the total fabric volume, measured as a percentage); (2) The heat resistance or melting point of the fibers; and (3) The thermal conductivity of the individual fibers. This latter allows for a thermal gradient to be established between the hot spot immediately beneath the flame, and cooler areas further away from the flame. While of paint material per area than a single coat of paint. Since the duration of effectiveness of a fire barrier is in part a function of the quantity of hydrate material available for release of water vapor, a laminate is a better insulator than the coating alone. Although two or three coats of paint alone can be applied to a surface to build up a dry thickness of 15 to 18 mils, a single laminate layer can build up to 25 mils thickness, while two or three layers of laminate can build up to ⅛" or more—all possessing the characteristics of the paint: refractory hard and abrasion resistant, and brilliant white; capable of serving as a fire barrier for 20 to 30 minutes when exposed to a flame of 1950° to 2000° F.

Both the coatings alone, and the coating laminates—single or multiple—can be sawn, nailed, stapled, or fastened with screws, without fracturing.

Instead of using woven or non-woven fabrics for increasing the tensile strength and serving as the stress-relief face for the coatings, a variety of types of chopped fibers could be used to serve the same functions, e.g. glass, steel, polyester, aramid, nylon, and other synthetic and natural materials.

EXAMPLE I

Type I Formula (Table I) intended for outdoor use, was made by the method indicated in the teachings (vide supra). In this formula, the colloidal silica (10) not only becomes a densifying agent and a waterproofing agent, but also becomes a co-bonding agent along with (1) and (2). Since the viscosity increases fairly rapidly, and the "pot-life" of a flowable coating is 15 to 20 minutes, batch size is limited to the quantity which can be applied in that period of time. It may be noted that when the colloidal silica (10) is added to the magnesium chloride, the reaction is highly exothermic. An opalescence develops, along with an increase in viscosity, which is reduced by the addition of the surfactant (9). The coatings were brushed onto a variety of substrates: 6"×6" fired ceramic tiles; 3"×6" concrete cylinders; 6"×15" of woven burlap (jute) fabric, and HOECHST Trevira non-woven needle-punched spunbond polyester fabric, grade 1110, 3.3 oz. per square yard; 6"×15"×¼" white pine board; 6"×15"×⅜" plywood. The fabrics were coated on both surfaces. However the coatings do not adhere to polyester film ("Mylar") and peeled off cleanly, leaving a smooth glossy surface.

The coatings started to gel in 1 hour, and initial set took place in 90 minutes. Final set varied from 2½ to 3 hours. The dried, fully-cured paint has a density of 1.56, equal to a weight of 97.4 lbs./ft.$^3$.

All coatings dried crack-free and refractory hard, resisting scratching by a steel knife blade (Mohs hardness 6.0). The coatings were rigid, and, in thin sections, brittle, brilliant white, smooth, highly glossy, and have remained unchanged in appearance for 20 months up to the time of the preparation of this disclosure. Unlike the other coatings—II, III, IV and VII, the Types I and VI, which contain colloidal silica, do not pick up moisture from the air, and the weight of the dry coating remains constant. Since the coatings were brush-applied, they varied in thickness from 4 to 6 mils thick, when dry. The samples were submitted to a battery of tests. The coatings were permitted to "cure" for 1 to 2 days prior to being exposed to a "standard" laboratory flame test.

Flame tests: Using a needle-tip propane torch of 1950° F. flame temperature, so that the tip of the blue cone of the flame played directly onto the painted surface from a distance of ¾" to 1", the coated burlap fabric and polyester fabric, mounted vertically, were separately exposed to the flame for 15 and 30 minute periods. Tests were replicated four times with similar results. When tested on the uncoated base fabric, the burlap ignited and burned, creating a flaming torch within 1 second. The polyester fabric ignited within 1 second and melted, and became self-extinguishing when the flame was removed, but in the continued presence of the flame, burning continued until the fabric was reduced to a molten mess. The coated surfaces were rendered "fire-proofed" under conditions of this test. There was zero flame spread. The 1" diameter area exposed to the flame first became "red hot", then "white-hot", and stayed in this condition for the full 15 and 30 minutes of the test. The fabric beneath the coating pyrolyzed and outgassed only in the area directly under the flame and in a penumbral circle of an additional ⅛" to 1" diameter. The coatings themselves did not crack, and while they did calcine, they retained their integrity and the source flame did not penetrate through the opposite side. Paper and other flammable materials held against the back of the fabric, directly under the flame impingement, carbonized but did not ignite. The "flame front" did not extend beyond the area of direct flame exposure.

Two layers of paint were applied on consecutive days to the wood panels (white pine board and plywood) with the result that the dried coatings were approximately 8 mils thick. The adhesion between the two coats was excellent, and no line of demarcation could be noted. When exposed to the propane torch test, if the full energy of the 1950° F. flame was applied immediately to the coating surface, the superficial layer would "pop" or decrepitate, due to the rapid volatilization and expansion of the contained residual moisture (not water of hydration). Bringing the surface temperature up gradually over a period of 1 minute, by first playing the flame over a larger surface area, obviated this decrepitation. For burn periods of 15 minutes, the results on the two boards were similar. The coatings held their integrity and there was zero flame spread of the substrate from the area immediately beneath the flame. The coating calcined only in the 1" diameter area directly under the flame and in an additional 1" penumbra (total diameter of approximately 3"). The substrates, after an initial 5-minute period, showed signs of carbonizing (pyrolysis), giving off thin wisps of smoke, but did not ignite or combust. The depth of the carbonization gradually continued for the full 15 minutes before the first indication of slight browning reached the back of the ¼" thick white pine board. Smoke density increased up to the 10 minute mark, after which it reached almost zero. At no time did the substrate flame, nor was there a "flame-front". The area of pyrolysis of the substrate was limited to that of the area of calcination of the coating (total 3" diameter). The degree of pyrolysis varied with the depth. At the end of 15 minutes while carbonization was complete immediately beneath the coating, there was a gradual diminution until at the rear of the panel there was only the initial indications of carbonization. The plywood panel smoked more densely due to the use of organic resin and adhesives between the layers, but also showed a lesser degree of pyrolysis. In contrast, the uncoated boards both flamed within 1 minutes, and the flame front extended up the board unchecked while being fired, and the flaming continued after the removal of the activating flame.

The coatings continued to adhere well to the substrate, without indication of debonding. The calcined area of the coating could be scraped away, but did not peel away or flake off of its own accord.

This series of tests indicated that the coatings themselves were non-combustible, and were capable of acting as a barrier to the ignition of susceptible wood and fabric substrates, and thus preventing the extension of a flame front.

In preparation for a certified ASTM D-3804 two-foot Tunnel Test for Flame spread, Smoke density, and Fuel Contribution to be run by an independent test laboratory (Applied Research Laboratories of Miami, Fla.), a 23¾"×3⅞"×¼" white pine panel was coated with Type I paint, and a layer of HOECHST Trevira non-woven spunbond geotextile fabric #1110 to form a single laminate. As indicated previously, such a construction consists of a base layer of paint applied to the bare wood, a strip of the polyester fabric of the same size as the board, rubbed or rolled in with a rubber roller or a squeegee, in order to saturate the fabric and a top layer of paint applied immediately. The fabric weighed 6.8 gms.; the pine board, 150.9 gms., while the laminate picked up a total of 205 gms. of paint (dry weight) equal to 2.23 gms. of paint per square inch. The total coating laminate had a thickness of approximately 25 mils. The dried paint was brilliantly white, refractory hard, and crack-free.

Results of the ASTM-D3804 Test, with a full 5 minute burn (instead of the customary 4 minute burn) at 2000° F., showed: Flame Spread 17.8; Fuel Contributed=0; Smoke Density 56.6; percentage loss in weight 11.8%. The control white pine panel showed: Flame Spread=73.0; Fuel Contributed=0; Smoke Density 578.9%; and Weight Loss=74.64%. The coated panel was barely scorched on the surface; there was no significant penetration of the coating or laminate, while the bottom half of the uncoated control was completely consumed, and the upper half reduced to a badly cracked, completely charred stick of charcoal. The smoke density and percentage loss in weight in the coated panel is principally due to the moisture vapor (steam) driven off during the heating of the coating—as it is supposed to be—in protecting the underlying susceptible substrates.

The coating adhered tenaciously to the 3"×6" concrete cylinder, leaving a smooth, glossy refractory-hard highly abrasion resistant impervious coating. Untinted, the coatings were a highly reflective bright white. The addition of minute quantities of HOECHST "Colanyl" pigments to the basic Type I formula permitted the coloring of the concrete coatings to be bright green, yellow, brown and black.

The coated ceramic tiles were weighed and immersed in tap water for periods of 7 and 14 days, after which they were dried and reweighed. There was no noticeable loss of weight, nor changes in the physical properties of hardness, nor gloss, which would indicate increase in porosity due to leaching of soluble salts.

A series of aggressive solvents was flooded over the surface of the coatings on the ceramic tiles, and each permitted to stand for 15 minutes, the excess drained, and the remainder dried off with paper toweling. The coatings did not soften, and showed only a minor loss of surface gloss to some of the treatments. Resistance to the following solvents was thus demonstrated: SOLVESSO 150 (a highly aromatic hydrocarbon); ACCUSOL S/T (20% ethylene glycol in monoethyl ether); Copier machine mix (a high-flash mineral spirit); MOBAY SOLVENT BLEND (4 parts cellulose acetate+1 part xylene+1 part methyl ethyl ketone (MEK)+1 part butyl acetate); kerosene, acetone and xylene.

The fluid paint was poured into a patterned plastic cup with raised printing, and rotated. The excess was poured off, leaving a thin shell mold. Upon drying and removal of the cup, the 6-mil thick layer of paint was not only smooth, brilliant white and crack free, but showed a remarkably faithful reproduction of the finest detail of the mold.

Thus the Type I coating not only performs a role as a fire barrier, but in addition has the necessary attributes of a good paint.

EXAMPLE II

Where outdoor use and exposure to rain is not contemplated, the colloidal silica (10) may well be omitted from the formulation, and Types II and III of Table I utilized for interior use. These differ only in the use of the surfactant (9) dispersing and wetting the binder powders of Part "A" so well that this permits a reduction of almost 15% in the amount of gauging fluid required for an equivalent paint viscosity. Type II paint has a pH of 8.5 and weighs 14.26 lbs. per gallon (1.71 gms./cc.). When the respective coatings are cured, there is little difference between them. Neither shows any cracking nor appreciable shrinkage. Both exhibit refractory hardness (Mohs 5.5), brilliant whiteness, high gloss and excellent adhesion to various substrates. Hence the results of the testing—the fire barrier properties under different configurations—will be treated together. Omitting the colloidal silica exposes the coating to moisture pick-up from humid atmospheres, and the cured coatings show an increase in weight until psychrometric equilibrium is established.

During a two-year period, over 100 "batches" of Types II and III formulations were made up to coat several hundred types, sizes, and configurations of test specimens. The only difference in the formulations was the grade of MgO (1) utilized. The prior discussion covers the characteristics (vide supra). There was no noticeable difference in the final results of the cured coatings. However, due to its longer "open-pot" time, BASIC CHEMICAL CO.'s Magox 98 LR is the preferred grade.

The various configurations of test specimens are categorized below; specimens made up for in-house fire-exposure screening tests and formal specimens made to the standards of ASTM D-3806 and submitted to an independent testing laboratory (APPLIED RESEARCH LABORATORIES of Miami, Fla.) for certified flame testing in their "Two-Foot Tunnel".

[a] Coating applied to bare fabric.
  1. Non-woven spunbond polyester
  2. Glass fiber cloth (woven fiberglass)
  3. Woven jute (burlap)
    x. Fabrics 1. and 2. were also used as the fabrics forming part of the coating laminate.
    xx. Generally, only a single coating laminate was utilized; occasionally, a double coating laminate was applied. Multiple laminates, consisting of 3 to 5 or more layers may also be constructed to form a rigid panel construction of ¼" to ½" thickness, or even up to a 1" thickness.
[b] coating and/or coating laminate applied to white pine board
[c] coating and/or coating laminate applied to laminated plywood
[d] coating and/or coating laminate applied to 5/32" wood panelling
[e] coating and/or coating laminate applied to thin one-ply doorskin
[f] coating and/or coating laminate applied to cedar roof shingles
[g] coating and/or coating laminate applied to compressed fiberglass "board"

[h] coating and/or coating laminate applied to gypsum wallboard

[i] coating and/or coating laminate applied to polyurethane foam board

[j] coating and/or coating laminate applied to isocyanurate foam board

[k] coating and/or coating laminate applied to polystyrene foam board

[l] coating and/or coating laminate applied to corrugated paperboard

[m] coating and/or coating laminate applied to wood fiber (cellulose) board ceiling panel

[n] coating and/or coating laminate applied to asbestos-cement board

[o] coating and/or coating laminate applied to plywood covered with vinyl wallpaper

[p] coating and/or coating laminate applied between two pieces of 3-ply laminated plywood

[q] coating and/or coating laminate applied between two pieces of 1-ply doorskin, and between 4 pieces of doorskin (4-ply).

[a] Type II and Type III Coatings on Bare Fabric.

[a]1. Pieces of HOECHST Trevira Spunbond Polyester geotextile fabric, grade 1110, 3.3 oz. per sq. yd., were cut into 5½" wide×14" long pieces. Coated with the paint on both sides. One group permitted to air dry, uncovered; another group was pressed between two sheets of polyester ("Mylar") film and permitted to "set" covered. Coating covered only 10" of the panel, permitting the uncoated 4" length to be used as a control. All coatings cured into a "refractory-hard" brilliant white surface, crack-free. The covered panels were smooth and glossy; and due to the compression, the dried coating on each side was 2½ to 3 mils thick and weighed a total of 104.7 gms. The coatings in the uncovered fabric were 4 mils thick on each surface. Each coated fabric was exposed several times to the standard 1950° F. propane torch test for 15 and 30 minute periods, all with similar results. The control sections of the panel, flamed and then melted within 1 second. The spot under the direct flame in the coated areas became "white hot" on both surfaces. The area on both sides calcined, but the flame did not break through to the opposite side, no hole was created in the fabric, and the coating did not crack and decrepitate. Occasionally, upon cooldown, the coating in the heated area did crack. The fabric in the heated areas volatilized and left a space between the top and bottom coats of paint. In the ½" to ¾" diameter penumbra surrounding the heated areas, the stroma of the fabric was still intact, but the fabric had carbonized. Beyond the penumbra (3" diameter), neither the fabric nor the coating showed any signs of change.

[a]2. An open-mesh woven fiberglass cloth, called SCANDATEX Wall Covering, 3 oz./sq.yd., with a 90 lbs./inch tensile strength, cut into strips 5½"×14", was used as the supporting matrix for a similar series of tests,—with comparable results. Even even 15 and 30 minutes of exposure, there is zero flame spread from the point of the flame application, with only minor lateral penumbral involvement. While the glass fibers do not volatilize, they do melt, but the strength of the coating maintains structural integrity of the sheet. Since the organic material content of the glass fabric is less than that of the polyester fabric or jute, it might be expected that the production of volatile gasses or smoke would be less, but this was not measured.

[a]3. An open-mesh woven burlap or jute, 8-mesh, 6.5 oz./sq.yd., cut into strips 5½"×14", was similarly coated on both surfaces with the paint, and tested by the propane torch method. Similar results were obtained. After 15 and 30 minute test exposure, there was zero flame spread, and the coatings held their integrity, although calcined.

In the above series of tests, which demonstrate the non-combustibility of the coatings and the ability of the coatings to prevent the penetration of open flame to the opposite surface, the fabrics acted as both a substrate and as a stress-relief "filler" preventing cracking and decrepitation, and indicated the value of this combination in forming a coating laminate for application to fire-susceptible substrates.

Table II lists the various combinations of coatings and/or coating laminates applied to a variety of substrates and the results obtained when these were subjected to flame testing to determine their fire-barrier characteristics.

TABLE II

FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| b | | | | | |
| b.1 | White Pine board | 6" × 12" × ¼" | Propane torch | Wood ignited in 15 seconds; flaming brand in 30 seconds; complete penetration to opposite side in 1½ minutes. | Uncoated control. |
| b.2 | Coating alone on White Pine board | 6" × 12" × ¼" | Propane torch | First 6 minutes - slight scorch on back of panel; no combustion; at 8 minutes, coating cracked; at 9 minutes, wood beneath coating ignited. Test terminated. | Two coats of paint; Coating thickness: 8 mils. |
| b.3 | White Pine board | 23⅞" × 3⅞" × ¼" | Two-foot Tunnel Test ASTM-D-3806 (5-minute burn) | Flame Spread: 73.0<br>Percent Loss: 74.64%<br>Smoke Density: 578.9%** | Uncoated control. Proximal half-length of board completely consumed, distal half completely charred and cracked. (Compare with b.7 and b.8.) [FIG. 1] |
| b.4 | White Pine board | 23" × 3" × ¼" | ASTM-D-3806 (5-minute burn) | Flame Spread: 69.0<br>Percent Loss: 83.60%<br>Smoke Density: 321.1%<br>Fuel Contribution Factor: 90.6 | Uncoated control. Plain White Pine board; almost completely consumed; charred remains from the distal end. |
| b.5 | Competitive coating on White Pine board | 23" × 3" × ¼" | ASTM-D-3806 (5-minute burn) | Flame Spread: 15.6<br>Percent Loss: 7.60%<br>Smoke Density: 46.1%<br>Fuel Contribution Factor: 0 | Benjamin Moore "RETARDO" intumescent paint, Control (2 coats), 12 mils thick. (Note: Intumescent paints are of short-term protection; under propane torch tests, break-throughs occur when the char is eroded by the flame's velocity) |
| b.6 | Coating alone on White Pine board | 23" × 3" × ¼" | ASTM-D-3806 (5-minute burn) | Flame Spread: 11.1<br>Percent Loss: 28.56%<br>Smoke Density: 79.0%<br>Fuel Contributed: 0 | Two coats of Type II, totalling 100.7 gms. (1.46 gms./sq. inch). Percent weight loss and smoke density principally due to water driven off in the heating. Minimal carbonization under the coating at the point of flame. Coating maintained adhesion to the substrate. |
| b.7 | Coating laminate | 23⅞" × 3⅞" × ¼" | ASTM-D-3806 (5-minute burn) | Flame Spread: 0<br>Percent Loss: 5.09%<br>Smoke Density: 0<br>Fuel Contributed: 0 | Single coat of paint and single layer of HOECHST spunbond non-woven polyester fabric. Superficial layer of coating decrepitated; undercoat was not affected; only slight evidence of scorch. Coating maintained excellent bond to substrate. (Compare with b.3) |
| b.8 | Coating laminate on White Pine board | 23⅞" × 3⅞" × ¼" | ASTM-D-3806 (5-minute burn) | Flame Spread: 0<br>Percent Loss: 3.89%<br>Smoke Density: 9.2%<br>Fuel Contributed: 0 | Double layer of polyester fabric, and double coat of paint, totalling ⅛" thick. Coating under flame emerged in perfect condition. No effects on substrate. Since photoelectric cell does not distinguish between the constituents causing the decrease in light intensity, this "smoke" is due to steam - vaporized water moisture. (Compare with b.3) [FIG. 1] |
| b.9 | Coating laminate on White Pine board | 23" × 3" × ¼" | ASTM-D-3806 (5-minute burn) | Flame Spread: 4.5<br>Percent Loss: 24.12%<br>Smoke Density: 79.0%<br>Fuel Contributed: 0% | Single coat of paint and single layer of Swedish "SCANDATEX" wall covering open-mesh woven fiberglass. Coating maintained its integrity. No significant carbonization of the substrate. |
| c | | | | | |
| c.1 | Interior/exterior laminated plywood | 8" × 8" × ½" | Propane torch | Initial flaming started in 20 seconds; zone of combustion extended 5" from epicenter; complete penetration of board, leaving a 1¼" diameter hole in 3 minutes. | Uncoated control. |

TABLE II-continued
FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| c.2 | Interior/exterior laminated plywood | 23⅞" × 3⅞" × ¼" | ASTM-D-3806 (5-minute burn) | Flame Spread: 73.0<br>Percent Loss: 58.61%<br>Smoke Density: 543.4 | Uncoated control. After burn test, remnants were a few broken pieces of charcoal, carbonized throughout. [FIG. 1] |
| c.3 | Coating alone on Interior/exterior laminated plywood | 12" × 12" × ¼" | Propane torch | Gently warmed area for 30 seconds to bring temperature up gradually to a full 1950° F. First 3 minutes, no noticeable change; at 5 minutes steam escape was noticeable; at 7 minutes first sign of carbonization of underlying wood (but not combustion); at 9 minutes cracks appeared in the coating; area under flame started to combust at 10 minutes, but no flame spread; temperature on back of the panel was 200° F. | Two layers of Type II paint, 10 mils thick. |
| c.4 | Single coating laminate on Interior/exterior laminated plywood | 12" × 12" × ¼" | Propane torch | Steam started to emerge at 3½ minutes; no decrepitating; at 5 minutes, coating was "white hot"; at 7 minutes, coating calcined, but no cracking; area under flame carbonizing, slight smoke emission; at 10 minutes, heavy smoke emission; ¼" deep carbonization, but no flame, only directly under impinging flame. | HOECHST spunbond polyester geotextile fabric was used in the laminate. |
| c.5 | Single coating laminate on Interior/exterior laminated plywood | 23⅞" × 3⅞" × ¼" | ASTM-D-3806 (5-minute burn) | Flame Spread: 0<br>Percent Loss: 3.00%<br>Smoke Density: 9.2%<br>Fuel Contributed: 0 | Compare with the uncoated control, Test c.2 above. HOESCHST spunbond polyester fiber fabric used in the laminate. |
| d<br>d.1 | Wood wall panelling | 23⅞" × 3¼" × 5/32" | ASTM-D-3806 (5-minute burn) | Flame Spread: 69.0<br>Percent Loss: 77.79%<br>Smoke Density: 584.2%<br>Fuel Contributed: 58.6 | Uncoated control. Georgia-Pacific, 3-ply untreated plywood. "CEDAR HOLLOW", simulated wood grain printed finish. |
| d.2 | Coating alone on Wood wall panelling | 23⅞" × 3¼" × 5/32" | ASTM-D-3806 (5-minute burn) | Flame Spread: 28.9<br>Percent Loss: 13.22%<br>Smoke Density: 71.1%<br>Fuel Contributed: 0 | Two coats of coating, alone, on front surface. Flame-tested on rear (uncoated) surface. Indicates that applying the coating laminate to the opposite side of a panel aids in slowing down fire spread. |
| d.3 | Coating laminate applied to Wood wall panelling | 23⅞" × 3¼" × 5/32" | ASTM-D-3806 (5-minute burn) | Flame Spread: 33.4<br>Percent Loss: 15.05%<br>Smoke Density: 19.7%<br>Fuel Contributed: 0 | Coating laminate, using woven fiberglass fabric applied to the front surface. Flame-tested on rear (uncoated) surface. Indicates that applying the coating laminate to the opposite side of a panel aids in slowing down fire spread. |
| f<br>f.1 | Red Cedar roof shingle | 18" × 6¼" × ⅛" to ½" | Propane torch | Uncoated section ignited in 6 seconds and became a fiery brand, reducing itself to charcoal and ash in 4 minutes. Flame spread was unchecked. | Uncoated control. |
| f.2 | coating alone on Red Cedar roof shingle | 18" × 6¼" × ⅛" to ½" | Propane torch | Coated section tested on back side: board ignited under tip of flame, and wood flamed for 5 minutes, but did not spread beyond a 1½" diameter flame front, until it reached the rear of the coating, then self-extinguished. 45-minute torch flame exposure, playing directly onto the rear of the unsupported | Two coats of coating alone, applied to one-half of the bottom surface of the shingle. Tested on top (uncoated surface). Results indicated that the applying of coating to the opposite surface of the panel prevents flame spread - of potential value in wood-shingled roof construction. |

TABLE II-continued
FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| g | | | | | |
| g.1 | Fiberglass "board" | 6" × 12" × 1" | Propane torch | bare coating, did not extend the flame front and did not affect the coating. Flame started to melt the glass in 10 seconds, eroding away the fibers in a circular hole; 1½" diameter hole was completely drilled through the panel in 45 to 60 seconds, leaving a rim of solidified glass beads in the wall. | Uncoated control. Johns-Manville fiberglass Air-duct board, without aluminum-foil facing; 6 pounds per cubic foot density. |
| g.2 | Coating alone on Fiberglass "board" | 12" × 12" × 1" | Propane torch | 1st Test, 5 minutes, followed by dissection of the top coating, ¼" to ⅜" depth - resin had vaporized, leaving grey unbonded fiberglass. No significant melting of glass. 2nd Test, 15 minutes, followed by dissection of top coating. Underneath the yet-whole coating, the fiberglass had melted, ¾" deep leaving a crater 2" in diameter, in whose wall there was the melted glass beads, with a ¼" thick fiberglass bottom. 3rd Test, 20-minute burn. Similar to 2nd test, but whole was completely drilled through to the bottom of the panel. | Single coat of Type II paint, at 1.6 gms./sq. in. 20-24 mils thick. Excellent adhesion to the resin-bonded fiberglass; no bond de-lamination after heating. Conclude that the coating had protected the non-combusitble fiberglass, permitting it to withstand the erosive action of the flames up to 15 times normal exposure. |
| g.3 | Fiberglass "board" | 24" × 3⅞" × ½" | ASTM-D-3806 (5-minute burn) | Flame Spread: 4.5<br>Percent Loss: 3.37%<br>Smoke Density: 85.5%<br>Fuel Contributed: 0 | Uncoated control. Johns-Mansville Air-duct Board, without aluminum foil; 6 lb./cubic foot density, sliced to half thickness of ½" to fit test equipment fixture. Flame had drilled completely through the panel, 2" in diameter, and for 4" diameter, had burned out the resin binder, with a 6" long scorch length. |
| g.4 | Coating alone on Fiberglass "board" | 24" × 3⅞" × ½" | ASTM-D-3806 (5-minute burn) | Flame Spread: 2.2<br>Percent Loss: 13.7%<br>Smoke Density: 21.1%<br>Fuel Contribution Factor: 0 | Two coats of Type III paint; 2.6 gms./sq. inch. Direct 5-minute flame had caused only a ¼" depth resin burnout under the flame; with only 1/32" depth of glass melting; no other significant changes. |
| g.5 | Coating laminate on Fiberglass "board" | 24" × 3⅞" × ½" | ASTM-D-3806 (5-minute burn) | Flame Spread: 2.2<br>Percent Loss: 9.42%<br>Smoke Density: 21.1%<br>Fuel Contribution Factor: 0 | Single coat laminate, using HOESCHT geotextile polyester spunbond fabric. 3.2 gms. of paint per square inch; coating in excellent condition; refractory hard; with excellent adhesion to the fiberglass substrate. Although the top layer of the coating cracked upon cooling, there was almost no change in the fiberglass substrate; no resin burnout; no melting of fiberglass - the laminated coating had afforded complete fire protection. |
| h | Gypsum plaster wallboard | | | | The surface paper covering of gypsum wallboard burns off in a fire. When hung horizontally, the plaster will crack, dehisce, and fall, exposing more susceptible substrates. This series of tests is to determine the effect of the coatings and coating laminates on preventing the decomposition of the plaster wallboard. |

TABLE II-continued
FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| h.1 | Gypsum plaster wallboard | 12" × 12" × 5/8" | Propane torch | Paper burned off in 10 seconds and substrate calcined progressively deeper with time. No flame spread, but at end of 15 minute test, area of calcination, 2" in diameter, had reached opposite side of panel and covering paper was scorched. Powdered calcined plaster easily punctured and scraped off, for full depth of panel. | Uncoated control. |
| h.2 | Coating alone on Gypsum plaster wallboard | 12" × 12" × 5/8" | Propane torch | In a corresponding 15-minute exposure test, the coating remained intact over the flamed area without cracking. The depth of calcination and powdering of the gypsum was 1/4" to 3/8", below which it retained its full strength, and there was no scorching on the rear surface. The board could not be punctured to its full depth. | Two layers of Type II paint. |
| h.3 | Gypsum plaster wallboard | 22" × 3½" × ½" | ASTM-D-3806 (5-minute burn) | Flame Spread: 0<br>Percent Loss: 3.55%<br>Smoke Density: 1,122.4%<br>Fuel Contribution Factor: 0 | Uncoated control. The paper coating of the proximal 5" length nearest to the flame source was burned off and 1/4" to 3/8" depth of panel was calcined and deeply fissured, and cracked easily during handling. |
| h.4 | Gypsum plaster wallboard | 22" × 3" × ½" | ASTM-D-3806 (5-minute burn) | Flame Spread: 4.5<br>Percent Loss: 6.07%<br>Smoke Density: 161.8%<br>Fuel Contributed: 0 | Uncoated control.<br>Results very similar to h.3. |
| h.5 | Coating alone on Gypsum plaster wallboard | 22" × 3" × ½" | ASTM-D-3806 (5-minute burn) | Flame Spread: 11.1<br>Percent Loss: 6.82%<br>Smoke Density: 10.5%<br>Fuel Contribution Factor: 0 | Two coats of Type II paint, totalling 82.3 gms. or 1.2 gms./sq. in. Wallboard covering paper charred beneath the paint, and there was 1/16" depth of plaster calcination. |
| h.6 | Coating alone on Gypsum plaster wallboard | 22" × 3" × ½" | ASTM-D-3806 (5-minute burn) | Flame Spread: 2.2<br>Percent Loss: 6.27%<br>Smoke Density: 336.8%<br>Fuel Contribution Factor: 0 | Two coats of Type II paint, totalling 136.5 gms. or 2.0 gms/sq. in. Wallboard paper under coating charred, but there was zero calcination of the plaster. Coating under flame maintained excellent adhesion to the charred paper. (Compare to h.3 test.) |
| h.7 | Coating laminate on Gypsum plaster wallboard | 22" × 3" × ½" | ASTM-D-3806 (5-minute burn) | Flame Spread: 0<br>Percent Loss: 5.68%<br>Smoke Density: 30.3%<br>Fuel Contribution Factor: 0 | Single laminate, using HOECHST geotextile spunbond polyester fabric. Slight degree of paper charring, but no plaster calcination under the flame. (Compare to h.3 test.) |
| i.1 | Rigid polyurethane foam board | 12" × 12" × 2" | Propane torch | Material ignited immediately, issuing heavy, acrid, sooty smoke. Continued to burn for 15 seconds after flame was removed, and smoldered for several additional minutes, leaving a black char. | Uncoated control. 6 pound density rigid urethane foam board. |
| i.2 | Coating laminate on Rigid polyurethane foam board | 12" × 12" × 1" | Propane torch | 1st 3 minutes, a slight amount of steam issued from area under flame; at 5 minutes smoke, associated with initial charring of the foam, commenced. Depth of char continued progressively as heating continued, but foam did not ignite. Coating remained | Used HOECHST spunbond polyester fabric in the laminate, with a total thickness of 40 mils. |

TABLE II-continued
FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| j | Isocyanurate foam board | 23" × 3½" × 1" | ASTM-D-3806 (5-minute burn) | intact for the 15 minutes of the test. Area of foam decomposition - 3" diameter. No flaming, and no flame spread. Flame Spread: 26.7 Percent Loss: 12.39% Smoke Density: 157.9% Fuel Contribution Factor: 0 | Celotex "THERMAX" isocyanurate insulation foam board with aluminum foil facing removed. Uncoated control. Although rated as "self extinguishing", the proximal 8" of the board was either completely consumed, or reduced to less than ½" thickness; flame burn showed along the complete length of the board. |
| j.2 | Coating alone on Isocyanurate foam board | 23" × 3½" × 1" | ASTM-D-3806 (5-minute burn) | Flame Spread: 2.2 Percent Loss: 7.13% Smoke Density: 25.0% Fuel Contribution Factor: 0 | Foam charred to a depth of ¼" immediately below point of flame impingement, but no spread beyond the 1½" diameter flame area, plus an additional ½" penumbral zone. Board essentially unaffected by the flame exposure. |
| j.3 | Coating laminate on Isocyanurate foam board | 23" × 3½" × 1" | ASTM-D-3806 (5-minute burn) | Flame Spread: 0 Percent Loss: 10.48% Smoke Density: 104.0% Fuel Contribution Factor: 0 | Laminate used was Swedish "SCANDATEX" woven glass fiber cloth. Flame exposure caused a ⅜" depth char in the foam directly under the foam and for a 1" diameter penumbral zone of influence. The coating remained intact, without cracks. 1½ pound/cubic density, insulation board. |
| k | Polystyrene foam board | 12" × 12" × 1" | Propane torch | Immediately upon exposure to flame, the polystyrene ignited and burned, and continued burning quietly, emitting dense, sooty, acrid smoke. After several minutes, the flame was self-extinguished. | |
| k.2 | Coating laminate on Polystyrene foam board | 12" × 12" × 1" | Propane torch | Within the 1st 15 seconds, the polystyrene melted beneath the point of the flame application, - without flaming and without smoking, leaving an empty space behind the laminated coating, which maintains its rigidity and strength. Thus there is zero flame spread. | Thin fiberglass veil used as the stroma for the 14 mil-thick Type II coating. |
| l | Corrugated paper board | 23" × 3½" × ½" | ASTM-D-3806 (5-minute burn) | Flame Spread: 69.0 Percent Loss: 87.95% Smoke Density: 296.1% | 3-flute, four layer, untreated corrugated paper board. 475 lb. test; used for heavy wall containers, partitions, temporary shelters, etc. Control was almost completely consumed, Only 5" of distal end was recognizable as a corrugated board, and this was badly charred and reduced to 2 flutes; all else was ash and carbonized paper. |
| l.2 | Coating alone on Corrugated paper board | 23" × 3½" × ½" | ASTM-D-3806 (5-minute burn) | Flame Spread: 0 Percent Loss: 13.81% Smoke Density: 0% Fuel Contribution Factor: 0 | Only the 4" length closest to the flame source was carbonized under the coating, and this only partially. The board, although blackened, still showed structural integrity. Rest of panel was unaffected. |
| l.3 | Coating laminate on Corrugated paper board | 23" × 3½" × ½" | ASTM-D-3806 (5-minute burn) | Flame Spread: 0 Percent Loss: 12.70% Smoke Density: 15.8% Fuel Contribution Factor: 0 | Results similar to 1.2. The flame showed a 4" long zone of influence which caused carbonization of two flutes of the board under the coating; leaving a free-standing coating in this area; but excellent adhesion of the coating to the paper in the area outside of the zone of |

TABLE II-continued

FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| m | Wood fiber (cellulose) board ceiling tile | 23" × 3" × ½" | ASTM-D-3806 (5-minute burn) | Flame Spread: 37.9 Percent Loss: 27.27% Smoke Density: 19.7% Fuel Contributed: 0 | influence. Uncoated control. Armstrong ceiling panel (acoustical) Type 195 Classic; Fed. Spec. SS-S-118-B, Class C Flame spread Index 76-200. The panel was scorched along the entire length, and under the point of flame application was completely eroded so that the panel broke into pieces. In propane torch tests, this panel, once ignited, after flame is removed, continues to smolder for 6 to 8 hours until entirely consumed by the combustion. |
| m.1 | | | | | |
| m.2 | Coating alone of Wood fiber (cellulose) board ceiling tile | 23" × 3" × ½" | ASTM-D-3806 (5-minute burn) | Flame Spread: 13.4 Percent Loss: 12.58% Smoke Density: 21.1% Fuel Contributed: 0 | Two coats of Type II paint, totalling 80 grams, or 1.16 gms/sq. in. The thin coating apparently cracked under the flame, thus accounting for the substrate to the flame, exposing the short length (4") of charred substrate; however, beyond this area, the panel was unaffected and intact. |
| n | Coating alone on Cement asbestos board | 23" × 3½" × 3/16" | ASTM-D-3806 (5-minute burn) | Flame Spread: 0 Percent Loss: 5.42% Smoke Density: 47.7% Fuel Contribution Factor: 0 | Purpose: to establish a "base-line" for behavior and performance of the Type II coating, when on a "standard" incombustible surface. Cement asbestos board resists only 600°-700° F. without disintegrating through loss of cement bond. The rigid board fractured under the coating, leaving the two coats of Type II paint as a free-standing sheet. |
| n.1 | | | | | |
| n.2 | Coating laminate on Cement asbestos board | 23" × 3½" × 3/16" | ASTM-D-3806 (5-minute burn) | Flame Spread: 2.2 Percent Loss: 12.63% Smoke Density: 38.2% Fuel Contribution Factor: 0 | Purpose: to establish a "base-line" for behavior and performance of the Type II coating laminate, with HOECHST spunbond polyester fabric when on a "standard" incombustible surface. |
| o | Vinyl wallpaper covered coating laminate on laminated plywood | 12" × 12" × ½" | Propane Torch | Wallpaper, under the direct flame, burned immediately in a 1½" circle, cut the flame did not spread and stopped at the edge of the penumbra. 1st 3 minutes, only traces of steam vapor was noted; at 5 minutes smoke from the carbonization of the wood was noted, but no flame; at 7 minutes, top ply of the panel had carbonized through, temperature on back of panel of about 160° F. At 10 minutes, middle plywood layer started to carbonize; at 12 minutes crack in coating permitted flame penetration to the substrate. At 15 minutes, rear surface of board showed scorch marks and initiation of carbonization. | 3-ply indoor/outdoor plywood, covered with Type II paint and HOECHST spunbond polyester fabric forming a laminate; the laminate being used as the adhesive for applying a 4-mils-thick decorative vinyl wallpaper to the substrate. The paint makes an excellent wallpaper adhesive, so tightly bonded that it could not be separated from the substrate without tearing. Results are similar to test c.4, Table II. The coating laminate forms an efficient barrier in preventing flame spread, which in 5 replicate tests did not extend beyond the 1⅛" diameter direct flame impingement area, plus an additional ¾" diameter penumbral zone of influence. |
| o.1 | | | | | |
| p | Coating laminate applied between two pieces of laminated plywood | 12" × 12" × ¾" (total thickness) | Propane torch | Surface of wood ignited immediately and burned; burning continued, carbonizing the three top lamina of plywood, reaching the coating layer in 4 minutes; this layer was not penetrated by the flame, and for the next 10 minutes there was no combustion of | Two pieces of ¼" thick 3-ply pl together with Type II paint, a combination fire barrier and adhesive. Paint was tinted with American HOECHST 17-3010 Colanyl caramel FK pigment, to yield a pine-yellow color, - so that the coating layer was indistinguishable from the |
| p.1 | | | | | |

TABLE II-continued
FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| | | | | | other wood ply layers. Coating made a superb adhesive, forming a perfect bond between the two plywood panels. The bond did not delaminate under the influence of the heat from the propane torch, nor from the ASTM-D-3806 test. (see also p.3) |
| p.2 | Coating laminate applied between two pieces of laminated plywood | 12" × 12" × ⅞" (total thickness) | Propane torch | the panel behind the barrier coating. There was only a gradual carbonizing (but no flaming, and no flame spread) of the second plywood sheet. Smoke emission, after the first 4 minutes, was minimal. Results similar to p.1. Combustion restricted to the top layer only, and the flame spread restricted to a 3-4" diameter circle. | Two pieces of ¼" thick, 3-ply plywood, bonded together with Type II paint, plus HOECHST spunbond polyester forming a single laminate. The laminate serves as an excellent adhesive, forming a bond which showed no line of separation even when the joined panels were subjected to heavy hammer blows. It is probable that the laminate also adds to the tensile properties of the plywood. Both this test and p.1 show that the fire barrier layer interposed between two susceptible layers can prevent the flame spread from the first layer to the second layer. |
| p.3 | Coating applied between two pieces of Laminate plywood | 23" × 3" × ⅞" (total thickness) | ASTM-D-3806 (5-minute burn) | (a) Flame applied to ¼" panel surface:<br>Flame Spread: 33.4<br>Percent Loss: 4.41%<br>Smoke Density: 132.9%<br>Fuel Contributed: 0<br><br>(b) Flame applied to ⅜" panel surface:<br>Flame Spread: 69.0<br>Percent Loss: 6.99%<br>Smoke Density: 69.7%<br>Fuel Contributed: 6.9% | Objective: to study the influence of a "submerged" barrier coating on flame spread, and the effect of nearness to the surface of this coating. Tests d.2 and d.3 had shown that barrier coatings on the rear of wood panelling limited flame spread on the uncoated surface.<br>Two samples, consisting of ¼", 3-ply plywood bonded to ½" of 4-ply plywood, with one coat of Type II paint were tested; one being burned on the ¼" surface (a), and the other on the ½" thick surface (b). In both cases, the single layer of paint made an excellent bonding adhesive which did not debond under the heat of the test even when the carbonized ply had reached the surface of the coating.<br>Panel (a) showed scorch on only the proximal half of the length; Panel (b) showed flame scorch over the entire length of the panel. In neither case did the flame penetrate the coating. The closer the coating to the wood surface, the greater the flame-spread protection. (See also p.1). |
| q<br>q.1 | Coatings applied between two pieces of 1-ply doorskin and between 4 pieces of doorskin (4-ply) | 8" × 8" × 5/16" and 6" × 8" × ½ | Propane torch | (a) Flame quickly punched a 1" diameter hole through the top layer, until it reached the barrier coating. No flame spread beyond the 1" diameter additional penumbra. Flame was effectively stopped by the coating. On a 25-minute test the rear of the panel gradually carbonized, but did not flame; the coating while "white-hot" remained intact and did not crack; paper placed on the opposite side of the coating scorched, but did not flame.<br>(b) Flame punched a 1" diameter hole through | (a) Two pieces of ⅛" thick wood veneer doorskin were bonded together using Type II coating.<br>(b) Four pieces of ⅛" thick wood veneer doorskin bonded together using three layers of Type II coating.<br><br>Unprotected, the wood is highly flammable.<br><br>These tests (and others) indicate the possibil- |

TABLE II-continued

FIRE BARRIER PROPERTIES OF TYPES II AND III COATINGS AND COATING LAMINATES ON VARIOUS SUBSTRATES

| *Refer to list | CONFIGURATION | SIZE | TEST METHOD | RESULTS | OBSERVATIONS |
|---|---|---|---|---|---|
| | | | | the top layer, which with time enlarged to 3" diameter; flame was stopped by 1st barrier coating layer; 2nd layer of veneer carbonized under 1st barrier coating, but did not flame nor combust. A total of 46 minutes was required for the rear surface to be carbonized . . . but at no time during the test did the 2nd, 3rd, or 4th layers combust. The three layers of barrier coating, separated by wood char, had formed not only a flame barrier, but a carbonaceous insulation which prevented flame spread. The pyrolyzed area on the rear of the panel was only 1" in diameter. | ity of constructing a multi-layer plywood panel with fire-barrier properties. |

**Based upon results for Red Oak as 100, and asbestos board as 0.
(Note: Refer to BACKGROUND OF THE INVENTION, column___.)

EXAMPLE III (Type IV Formulation)

Because of the occasional tendency of Types II and III coatings to decrepitate when heated rapidly, and to crack upon cooldown after exposure to the high temperature test flames, expanded vermiculite was added to the formulation to serve as stress-relief foci (vide supra, in the teachings). The formulations which include this component follows closely Types II and III, with suitable adjustments in the quantity of the gauging fluid to allow for the higher fluid absorption of this material, in order to maintain the same paint viscosity. The substitution of the expanded vermiculite for half of the silica flour did not affect the characteristics of the coating— which dried refractory hard and crack-free.

(a) Coated a 12"×12"×½" plywood board with a single coat of paint (4–5 mils thick).

(b) 12"×4"×½" plywood board with a single coat laminate, using Swedish "SCANDATEX" woven fiberglass wall covering.

(c) 23⅞"×3½"×5/32" wood wall panelling; double coat of paint alone.

(d) 23⅞"×3½"×5/32" wood wall panelling; single coat of paint laminate, using SCANDATEX woven fiberglass.

(a) and (b) were submitted to propane torch tests; (c) and (d) were tested by ASTM-D-3806.

(a) In a series of 6-minute tests, there was noticeable steam emitted at 3 minutes, wisps of smoke at 5 minutes, and, in one case, cracking of the coating. Dissection of the burn area showed no sign of discoloration on the rear of the panel, and carbonized wood to a depth of only ⅛". There was zero flame spread beyond the flame impact area. There was no sign of decrepitation in any test.

(b) In a 15-minute test, steaming started at 5½ minutes; at 7 minutes, smoke started; at 12½ minutes, rear of panel showed discoloration. At the end of the test, wood was carbonized to a depth of ⅜" and showed cracks—only under the flame impingement area. There was no flame spread. The coating remained intact and crack-free; and there was no decrepitation, even though the full flame had been applied immediately to the surface without a preliminary warm-up.

| (c) Flame Spread: | 6.68 |
|---|---|
| Percent Loss: | 3.6% |
| Smoke Density: | 43.42% |
| Fuel Contributed: | 0 |
| (d) Flame Spread: | 2.23 |
| Percent Loss: | 4.8% |
| Smoke Density: | 17.11% |
| Fuel Contributed: | 0 |

Both (c) and (d) coatings came through the ASTM-D-3806 test in excellent condition. No decrepitation; no cracks; hardly a sign of flame exposure, except for a slight calcination. The highly flammable wood panelling substrate showed minimum carbonization, and the coatings maintained excellent adhesion to the substrate, under the area of direct flame impingement.

EXAMPLE IV (Type V Formulation)

Type V formula was developed to determine the effects of adding a well-known fire-retardant material, alumina trihydrate, to the "mag-oxychloride" formula. The resulting coatings were particularly smooth and brilliant white, as well as hard (Mohs 4.5), and crack-free; exhibited little shrinkage, and had excellent adhesion to a variety of substrates.

(a) Single coating applied to a 12"×12" piece of HOECHST non-woven spunbond polyester fabric, grade 1110.

(b) Single coating laminate, using same fabric, applied to a 12"×12"×½" wood waferboard. Utilized 1.17 gms. of paint per square inch of surface.

(c) Single coat, 4 mils thickness, dry, applied to a piece of 12"×4"×¼" White Pine board.

(a) and (b) were tested by the propane torch method; (c) was tested by the "chimney" method.

(a) At 1 minute, whiffs of steam were noted; at 2 minutes, slight smoke arose from the carbonization of the fabric stroma in the area under the impinging flame; at 3 minutes, coating started to calcine and the area under the flame became "white-hot", both on the front and back surface, and developed cracks which radiated out from the center into the penumbral area. In a 15-minute test, although there was no flame spread, the cracks widened and small chunks of coating fell off, leaving a hole in the central flamed area. The central 1¼"-diameter area under the direct flame was completely calcined, and there was a ⅜"-diameter penumbral area surrounding the central area, of lesser degree of calcination. This Type V formulation does not possess the physical resistance of Types, I, II, or III, in its inability to hold the unsupported coating intact without cracking during the period of calcination.

(b) In 4 replicated tests, at 1 minute steam emission was noted; at 2 minutes paint developed cracks; at 3 minutes paint cracks propagated in all directions and opened wider; at 3½ minutes, although there was no decrepitation, wood underneath the laminate started to combust (burn),—not merely carbonize without flaming, as would have taken place if the coating had remained intact. By 7 minutes, wood under the coating was in self-sustained combustion.

(c) In the chimney test, two pieces of wood (the coated piece and an uncoated control) are set up in parallel, facing each other, and separated by a 1" spacer at the top. The bottoms of the boards are protected by sheet metal, and the unit is set on top of an open can of "STERNO" (solidified wood alcohol), which is ignited, so that the 1400° F. flame rises in the "chimney" formed by the two opposing test specimens. At 1 minute, the uncoated control was a blazing inferno, the flames licking up the complete 12" length of the board, with severe charring at the base. At 5 minutes, the basal 6" length of the control board was reduced to char, at which time the tests were terminated. In the coated panel, the coating developed longitudinal and horizontal cracks, and some pieces had exfoliated. The pine boards showed a 1/16"-thick layer of char under the coating, but there was no indication of combustion or flaming.

EXAMPLE V (Type VI and VII Formulations)

Types VI and VII formulations were developed to take advantage of the reputedly higher thermal decomposition temperature and higher water-of-hydration content of magnesium "oxysulphate" cements over magnesium "oxychloride" cements. C. W. REDEKER (1967) found that the "oxysulphate" cements withstand a 400°–500° F. higher temperature. Normally, the "oxysulphate" cements are markedly softer and more abrasive-prone.

Types VI and VII overcame the surface softness problem, and brought the "oxysulphate" coatings up to an acceptable 5.0 and 5.5 Mohs hardness... the former by the use of a colloidal silica (as is used in Type I formulation) and the latter by using high alumina calcium aluminate cement, as in Types II, III, and IV formulations. Both coatings are brilliant white.

The major drawback of both Type VI and VII formulations is the appearance of surface and deep crazing ("mud-cracking") in the dried coatings when applied as coatings alone on any of the numerous types of substrates listed in Example II. This crazing not only detracts from the cosmetic acceptability of the coating, but also, under flame-testing, the cracks open up and expose the substrate to the direct flame, which results in substrate ignition.

The problem of crazing in the Type VI and VII "oxysulphate" cement coatings has been eliminated by applying the paint onto a non-woven spunbond polyester geotextile fabric. Here the interlaced fibrils of the fabric form the necessary stress-relief foci, so that the coatings set crack-free.

When applied to fabric as a free-standing coating, without a substrate, and subjected to the propane torch test, the coatings behaved the same as discussed under Type II and III coatings, tests a.1,—namely that the coatings withstand direct flame exposure for 15 and 30 minutes, without a flame spread beyond the direct impingement area; and without burning holes through the fabric.

Type VI and VII coating laminates, applied to wood substrates. The propane torch test is not sufficiently sensitive to distinguish differences in results between "oxychloride" and "oxysulphate" coatings. Both VI and VII type coatings, when applied to the surface of White Pine and laminated plywood, were capable of protecting the substrates from ignition and flame-spread for periods of 15 minutes, and with thicker coatings, for 20 to 25 minutes.

While Type VI and VII coatings can be categorized as "satisfactory", Types I, II, and III are the preferred formulations.

APPLICATIONS

From the teachings and test results presented in this disclosure, it is obvious that the paint, subject of this invention, has numerous applications of great utilitarian value.

1. Non-combustible coatings. Since the coating does not burn, it may be used in those confined areas or enclosed spaces which cannot risk the dangers inherent in a paint that burns.

2. High-temperature coatings. Since the coatings withstand 1900° F. for extended periods of time, they may be applied in those situations which require high temperature protective paints (for example, coatings for furnaces, wood stoves, mufflers, or as high-temperature radiation reflectors).

3. Abrasion Resistant Coatings. Since the coatings are hard and refractory, with great compressive strength, they may be applied over soft surfaces or plastic foams to lend rigidity, puncture-proofness, and abrasion resistance to susceptible substrates.

4. Adhesive Bonding Agent for Wood, Wallpaper, etc. The coatings exhibit exceptional bonding strengths for wood and paper, hence may be used as an adhesive for the bonding of wood lamina in the construction of plywood; in the assembly of corrugated paper board or honeycomb panels; or the adhesion of wallpaper or decorative foils to walls or substrates, and at the same time, impart fire-barrier or flame-stop properties.

5. Structural Laminates. When multilayers (4 to 12) are built up from paint impregnated non-woven spunbond polyester geotextile fabric, and the layers pressed together while curing, non-magnetic, fire-retardant, structural laminates of tremendous compressive and tensile strengths are formed. Resistant to biodegrading agents, these structural laminates can be made in the form of sheets, tubes, posts, curved panels, etc.

6. Fire-Barrier Coatings. Potential applications are for roofing; walls; fire doors; lining of school and hospital fire-egress exits; aircraft, boat or ship interiors; coating of horse stables or animal barns; coatings for foam plastics; coatings for plastic pipe, wire and cable conduits; acoustic or decorative ceiling tiles; corrugated paper board containers; fireplace hearths and backing; waste containers; etc.; as well as improving the surface properties of gypsum plaster wallboard.

Disclosed herein are new and useful coatings and coating laminates, in several alternative formulations, which have proven capable of forming "fire-barriers" which prevent flame penetration, ignition, and flame spread to a wide variety of fire-susceptible substrates.

These formulations have overcome the numerous shortcomings of the Prior Art; viz., salt efflorescence and syneresis of excess fluids; water solubility; high shrinkage; crazing or "mud-cracking"; spalling (decrepitation) under fire; proneness to abrasion due to softness; need to maintain delicate stoichiometric balance of the principal components; deleterious effects of the excess fluid required for smooth paint application; etc.

There has been developed a durable, rapid-setting, non-combustible thin coating capable of protecting susceptible flammable substrates from ignition and flame-spread, which, at the same time, has the necessary characteristics of a good paint, and which bonds firmly to a wide variety of substrates.

What is claimed is:

1. A composition suitable for use as a fire barrier when cured, said composition comprising a flowable, substantially uniform dispersion of:
   (A) a binder component comprising a powdered, substantially uniform mixture of
      (1) heat activated MgO, and
      (2) high-alumina calcium aluminate cement comprising 70% to 80% $Al_2O_3$; in
   (B) a gauging component in about a stoichiometric amount sufficient to react with said binder component, wherein the gauging component comprises an aqueous solution of $MgCl_2$ or $MgSO_4$, wherein the aqueous solution has a specific gravity of about 26° to about 32° Baume.

2. Composition according to claim 1 in which the binder component includes $TiO_2$.

3. Composition according to claim 1 in which the gauging component contains a sodium tetradecyl sulphate anionic surfactant in an amount sufficient to wet the powdered mixture to aid in dispersing said mixture in said gauging component.

4. Composition according to claim 1 in which the binder component includes alumina trihydrate as a filler.

5. Composition according to claim 1 in which the binder component includes vermiculite as a filler.

6. Composition according to claim 1 in which the binder component includes silica flour as a filler.

7. Composition according to claim 1 in which the gauging component includes a colloidal dispersion of colloidal silica in dimethyl formamide, said component serving also as a co-binder cement along with the magnesium "oxide, magnesium chloride" and high alumina calcium aluminate cements.

8. A solid substrate having a coating thereon, wherein the coating comprises the composition of claim 1.

9. A fire barrier comprising a rigid support and a dry coated substrate of claim 8 adhered to said support.

10. Coated substrate according to claim 8 wherein the substrate is a non-woven spunbonded polyester fabric or a woven or non-woven fiberglass fabric.

11. Coated substrate according to claim 10 in which said fabric has opposing sides and each side of said fabric has said coating thereon.

12. A fire barrier comprising a rigid layer having opposing faces and a dry coated substrate of claim 9 adhered to each face of the layer.

13. A fire barrier comprising a rigid layer having opposing faces and a dry coated substrate of claim 9 adhered to each face of the layer.

14. A fire barrier according to claim 13 in which the rigid layer is wood, gypsum wallboard, polyurethane foam board, isocyanurate foam board, polystyrene foam board, corrugated paper board or cellulose ceiling tile.

15. A method of making a composition according to claim 1 comprising:

(A) preparing a substantially dry, powdered binder component comprising
  (1) heat activated MgO, and
  (2) high-alumina calcium aluminate cement comprising 70% to 80% $Al_2O_3$;
(B) preparing a gauging component comprising an aqueous solution of $MgCl_2$ or $MgSO_4$, wherein the aqueous solution has a specific gravity of about 26° to about 32° Baume;
(C) gradually adding said binder component to said gauging component with mixing to substantially uniformly disperse said binder component in said gauging component;
wherein said gauging component is employed in about a stoichiometric amount relative to said binder component.

16. Method according to claim 15 wherein said binder component contains silica flour and titanium dioxide as substantially dry powdered fillers.

17. Method according to claim 16 in which a colloidal dispersion of silica in dimethyl formamide is added to said aqueous solution.

18. Method according to claim 17 comprising slowly adding a sodium tetradecyl sulphate anionic surfactant to said aqueous solution, gradually adding said colloidal silica dispersion to the resulting surfactant-containing solution to form an opalescent dispersion, and then gradually adding said binder component to said opalescent dispersion with mixing to substantially completely wet particles of said powdered binder component.

* * * * *